United States Patent
Lim et al.

(10) Patent No.: US 10,055,761 B2
(45) Date of Patent: Aug. 21, 2018

(54) ECONOMIC FILTERING SYSTEM FOR DELIVERY OF PERMISSION BASED, TARGETED, INCENTIVIZED ADVERTISING

(71) Applicant: Google LLC, Mountain View, CA (US)

(72) Inventors: Stanley T. Lim, San Jose, CA (US); John Galen Giddings, Los Gatos, CA (US); Laura Giddings, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 948 days.

(21) Appl. No.: 14/263,854

(22) Filed: Apr. 28, 2014

(65) Prior Publication Data

US 2014/0236711 A1 Aug. 21, 2014

Related U.S. Application Data

(63) Continuation of application No. 14/028,506, filed on Sep. 16, 2013, now Pat. No. 8,712,834, which is a continuation of application No. 12/702,118, filed on Feb. 8, 2010, now abandoned, which is a continuation of application No. 10/001,512, filed on Oct. 31, 2001,
(Continued)

(51) Int. Cl.
*G06Q 30/00* (2012.01)
*G06Q 30/02* (2012.01)

(52) U.S. Cl.
CPC ......... *G06Q 30/0256* (2013.01); *G06Q 30/02* (2013.01); *G06Q 30/0207* (2013.01); *G06Q 30/0229* (2013.01); *G06Q 30/0241* (2013.01); *G06Q 30/0251* (2013.01); *G06Q 30/0269* (2013.01)

(58) Field of Classification Search
USPC .......................................................... 705/14
See application file for complete search history.

(56) References Cited

U.S. PATENT DOCUMENTS 5,377,258 A * 12/1994 Bro .................... G06F 19/3456
379/106.02
5,704,017 A 12/1997 Heckerman et al.
(Continued)

FOREIGN PATENT DOCUMENTS

WO WO 98/34189 8/1998

OTHER PUBLICATIONS

U.S. Appl. No. 09/597,975, Examiner Interview Summary dated Dec. 11, 2003, 2 pp.
(Continued)

*Primary Examiner* — Alvin L Brown
(74) *Attorney, Agent, or Firm* — Fish & Richardson P.C.

(57) ABSTRACT

A method to control advertising messages directed at a user is provided. Such control might include setting a filter to control advertisements directed at a user. Advertisements are sent to a user based on the filter settings. The user may accept the advertisements. If the user accepts the advertisements, the user is provided with a reward. In addition, a method using a quiz to determine if a user is human or an automated respondent is provided. The user is presented with a quiz. The user is advised of the acceptable manner for responding to the quiz. The user's response to the quiz is received. A determination based on the user's response as to whether the user is a human or an automated respondent is made.

17 Claims, 31 Drawing Sheets

Related U.S. Application Data now Pat. No. 7,660,737, which is a continuation-in-part of application No. 09/618,806, filed on Jul. 18, 2000, now Pat. No. 8,527,337.

(60) Provisional application No. 60/244,826, filed on Oct. 31, 2000.

(56) References Cited

U.S. PATENT DOCUMENTS

| | | | |
|---|---|---|---|
| 5,724,521 | A | 3/1998 | Dedrick |
| 5,754,939 | A | 5/1998 | Herz et al. |
| 5,794,210 | A | 8/1998 | Goldhaber et al. |
| 5,867,799 | A | 2/1999 | Lang et al. |
| 5,918,014 | A | 6/1999 | Robinson |
| 5,933,827 | A | 8/1999 | Cole et al. |
| 5,964,839 | A | 10/1999 | Johnson et al. |
| 5,974,398 | A | 10/1999 | Hanson et al. |
| 5,983,214 | A | 11/1999 | Lang et al. |
| 5,991,735 | A | 11/1999 | Gerace |
| 5,999,975 | A | 12/1999 | Kittaka et al. |
| 6,006,218 | A | 12/1999 | Breese et al. |
| 6,009,410 | A | 12/1999 | LeMole et al. |
| 6,029,161 | A | 2/2000 | Lang et al. |
| 6,041,311 | A | 3/2000 | Chislenko et al. |
| 6,078,866 | A | 6/2000 | Buck et al. |
| 6,093,026 | A | 7/2000 | Walker et al. |
| 6,182,133 | B1 | 1/2001 | Horvitz |
| 6,195,698 | B1 | 2/2001 | Lillibridge et al. |
| 6,230,204 | B1 | 5/2001 | Fleming, III |
| 6,269,361 | B1 | 7/2001 | Davis et al. |
| 6,480,853 | B1 | 11/2002 | Jain |
| 6,516,302 | B1 * | 2/2003 | Deaton ............... G06Q 20/20 705/14.38 |
| 6,519,571 | B1 | 2/2003 | Guheen et al. |
| 6,529,878 | B2 | 3/2003 | De Rafael et al. |
| 6,564,170 | B2 | 5/2003 | Halabieh |
| 6,567,850 | B1 | 5/2003 | Freishtat et al. |
| 6,591,248 | B1 | 7/2003 | Nakamura et al. |
| 6,606,620 | B1 | 8/2003 | Sundaresan et al. |
| 6,647,425 | B1 | 11/2003 | Chaddha |
| 6,687,696 | B2 | 2/2004 | Hofmann et al. |
| 6,718,017 | B1 | 4/2004 | Price |
| 6,732,090 | B2 | 5/2004 | Shanahan et al. |
| 6,828,992 | B1 | 12/2004 | Freeman et al. |
| 6,915,482 | B2 | 7/2005 | Jellum et al. |
| 6,981,040 | B1 | 12/2005 | Konig et al. |
| 7,076,443 | B1 | 7/2006 | Emens et al. |
| 7,320,031 | B2 | 1/2008 | Konig et al. |
| 7,660,737 | B1 | 2/2010 | Lim et al. |
| 2001/0039493 | A1 | 11/2001 | Pustejovsky |
| 2001/0039515 | A1 | 11/2001 | Mayadas |
| 2002/0038289 | A1 * | 3/2002 | Lawlor ............... G06Q 20/04 705/42 |
| 2002/0046095 | A1 * | 4/2002 | Wallace ............... G06Q 30/02 705/14.2 |
| 2003/0079185 | A1 | 4/2003 | Katariya et al. |
| 2003/0158776 | A1 | 8/2003 | Landesmann |
| 2005/0086186 | A1 | 4/2005 | Sullivan et al. |
| 2005/0172021 | A1 | 8/2005 | Brown |
| 2005/0289015 | A1 | 12/2005 | Hunter |
| 2006/0235722 | A1 | 10/2006 | Brown |
| 2006/0282319 | A1 * | 12/2006 | Maggio ............... G06Q 30/02 705/14.19 |
| 2007/0105080 | A1 | 5/2007 | Hersh |
| 2008/0052171 | A1 | 2/2008 | Eldering |
| 2008/0201344 | A1 * | 8/2008 | Levergood ............ G06Q 20/10 |
| 2009/0125395 | A1 | 5/2009 | Coleman |
| 2009/0254971 | A1 | 10/2009 | Herz |
| 2010/0280906 | A1 | 11/2010 | Lim et al. |
| 2013/0007050 | A1 | 1/2013 | Work |
| 2014/0019270 | A1 | 1/2014 | Lim et al. |

OTHER PUBLICATIONS

U.S. Appl. No. 09/597,975, Final Office Action dated Jun. 4, 2004, 32 pp.

U.S. Appl. No. 09/597,975, Final Office Action dated Dec. 3, 2003, 17 pp.

U.S. Appl. No. 09/597,975, Non-final Office Action dated Jan. 29, 2004, 25 pp.

U.S. Appl. No. 09/597,975, Non-final Office Action dated Jun. 4, 2003, 13 pp.

U.S. Appl. No. 09/597,975, Non-final Office Action dated Jul. 8, 2005, 14 pp.

U.S. Appl. No. 09/597,975, Non-final Office Action dated Nov. 17, 2004, 30 pp.

U.S. Appl. No. 09/597,975, Notice of Allowance dated Sep. 22, 2005, 3 pp.

U.S. Appl. No. 09/597,975, Response filed Mar. 4, 2004 to Non-final Office Action dated Jan. 29, 2004, 11 pp.

U.S. Appl. No. 09/597,975, Response filed Aug. 8, 2005 to Non-final Office Action, dated Jul. 8, 2005, 7 pp.

U.S. Appl. No. 09/597,975, Response filed Sep. 1, 2004 to Final Office Action dated Jun. 4, 2004, 6 pp.

U.S. Appl. No. 09/597,975, Response filed Sep. 4, 2003 to Non-final Office Action dated Jun. 4, 2003, 10 pp.

U.S. Appl. No. 09/597,975, Response filed Dec. 16, 2003 to Final Office Action dated Dec. 3, 2003, 6 pp.

U.S. Appl. No. 09/597,975, Response filed Dec. 22, 2004 to Non-final Office Action dated Nov. 17, 2004, 24 pp.

U.S. Appl. No. 11/316,785, Non-final Office Action dated Aug. 22, 2006, 7 pp.

U.S. Appl. No. 11/316,785, Notice of Allowance dated Aug. 7, 2007, 3 pp.

U.S. Appl. No. 11/316,785, Response filed Feb. 5, 2007 to Non-final Office Action dated Aug. 22, 2006, 2 pp.

The Gale Group "Internet Access: ZurfRider Personal Internet Search Utility Reduces Search Time Up to 75%," Dec. 15, 1997.

A Wall Street Rebound for Hypercom: Magazine/Journal, Trade: Dec. 1998, 3 pp.

Bassett et al, "A Study of Generalization Techniques in Evolutionary Rule Learning,"Paper, 2002, 90 pp.

Lecun, Y., "Machine Learning and Pattern Recognition," lecture presented at The Courant Institute, New York University, 2004.

Mobasher, B., "Automatic Personalization Based on Web Usage Mining," [online]. Retrieved from the Internet: <URL: http://maya.cs.depaul,edu/~mobasher/personalization>, 25 pp.

Pretschner, A., "Ontology Based Personalization Search," Maters Thesis, Department of Electrical Engineering and Computer Science, University of Kansas, 1998, 125 pp.

* cited by examiner

User Attributes Configuration Page - Screenshot

| Attribute | User Names | Submit on Approval for Demographic Qualification | Submit on Approval for Demographic Research |
|---|---|---|---|
| Name | Stan Lim | | |
| Age | 30 | | |
| Gender | MALE | | |
| Date of Birth | | | |
| Zipcode | 95128 | | |
| Household income | | | |

500

SUBMIT    CANCEL

Fig. 5

| Attribute | User Data Available? | Demographic Bonus | Research Bonus | Share Demographic Bonus? | Share Research Bonus? | User Bonus |
|---|---|---|---|---|---|---|
| Name | ! | 200 | 200 | ! | ! | 400 |
| Age | ! | 100 | 100 | ? | ? | 0 |
| Gender | ! | 100 | 100 | $ | $ | 200 |
| Date of Birth | ??? | 500 | 500 | ? | ? | 0 |
| Zipcode | | 500 | 500 | $ | $ | 1000 |
| Household Income | ??? | 10000 | 10000 | $ | $ | |
| Number of cars | 5 | 5000 | 5000 | $ | $ | 10000 |
| Total Bonus | | | | | | 11600 |

UPDATE    CANCEL

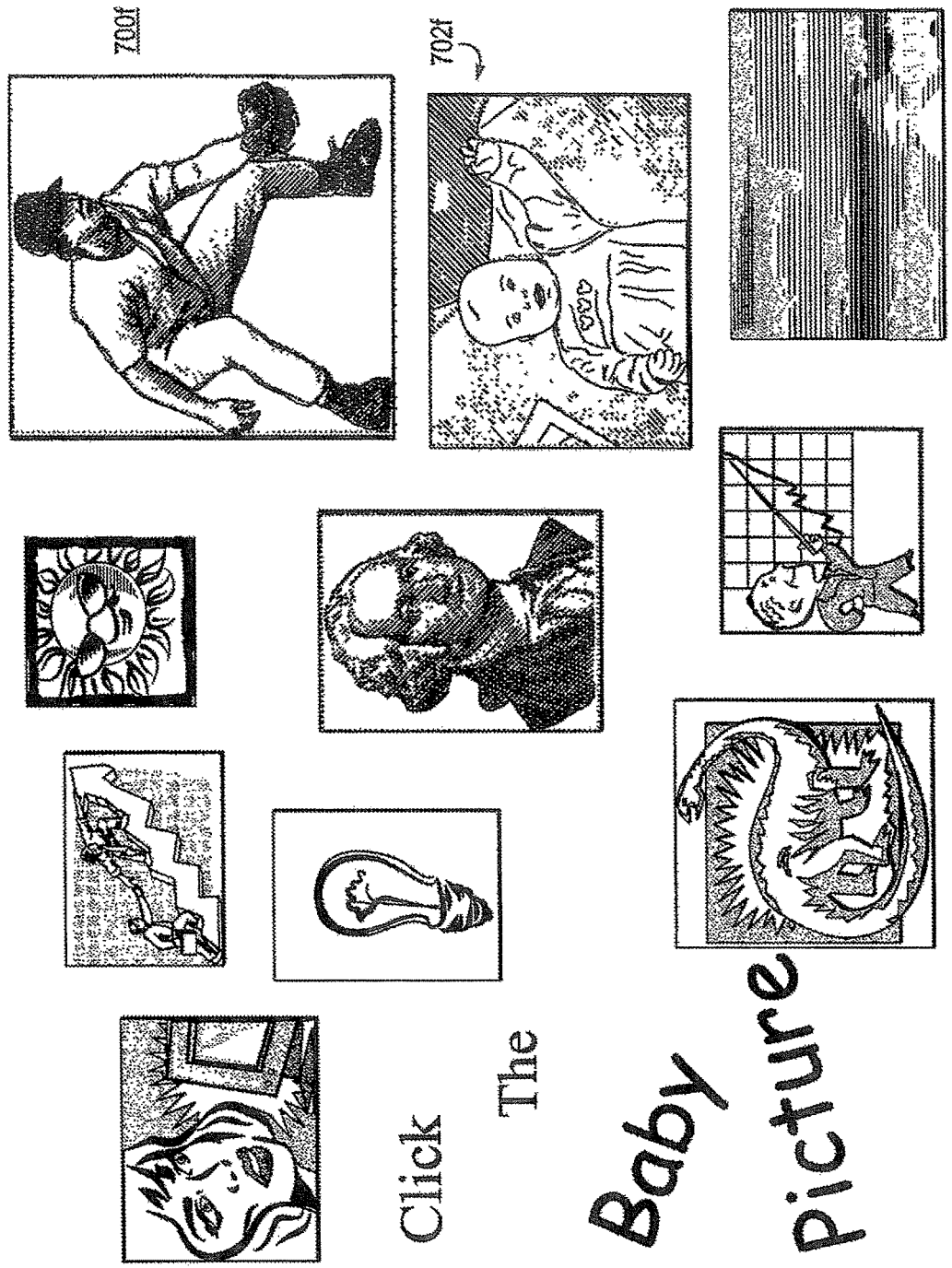

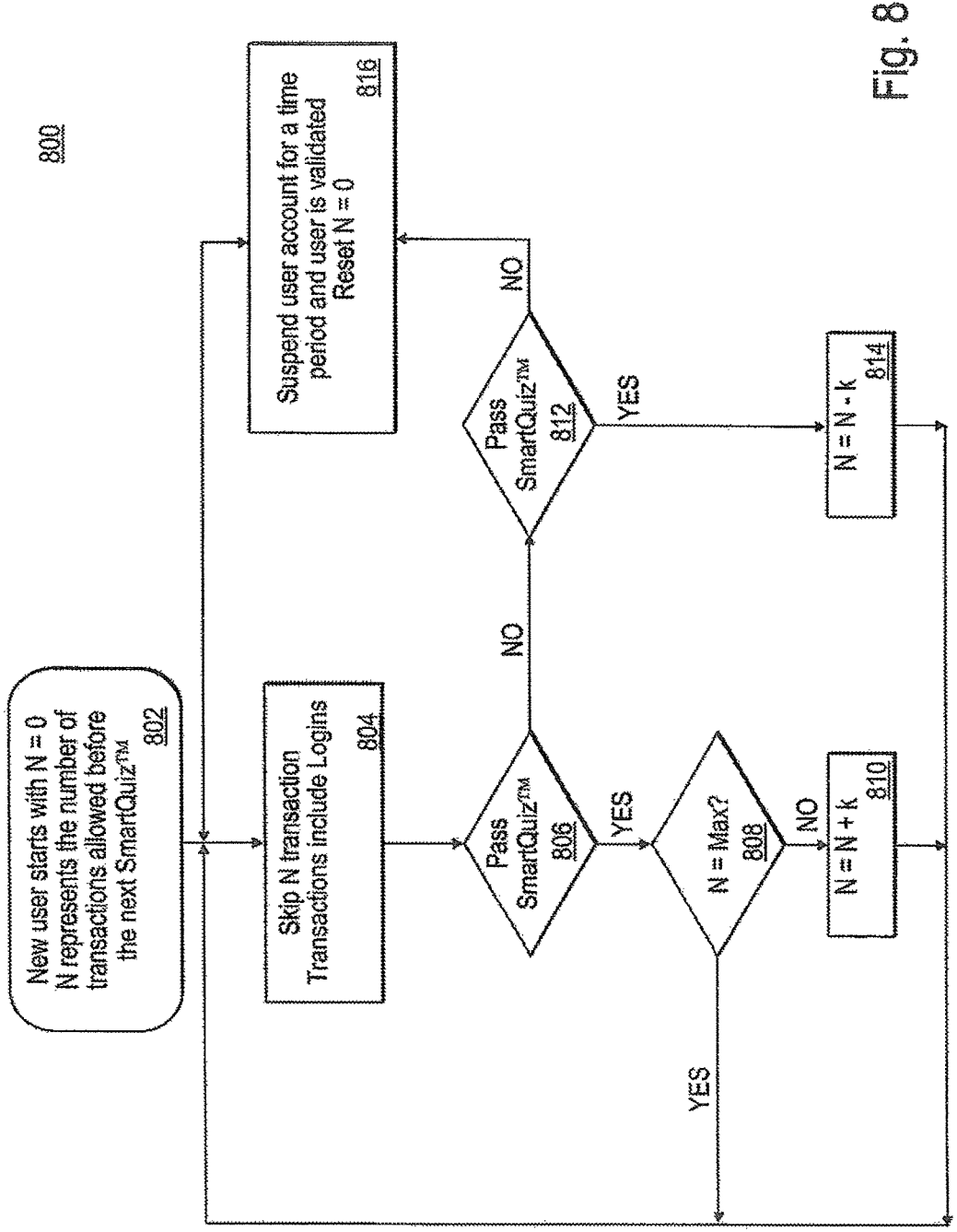

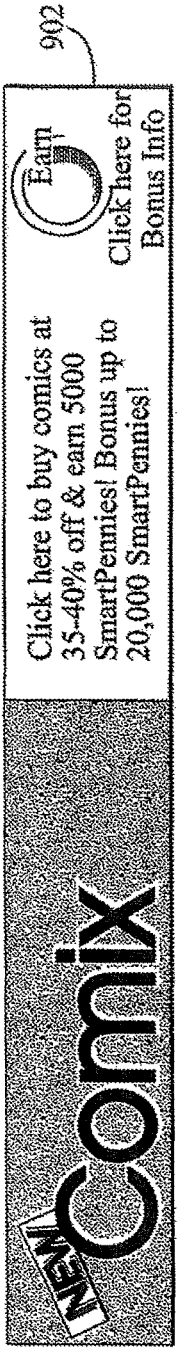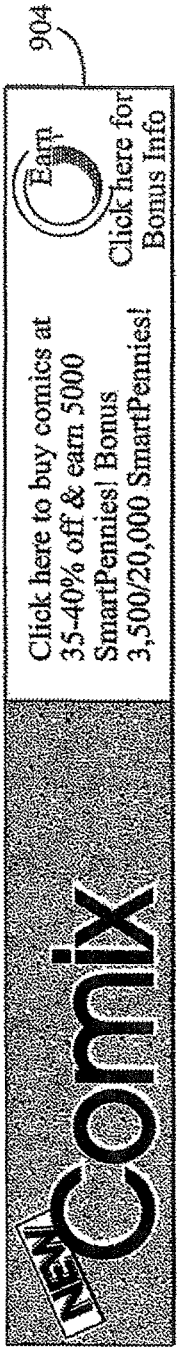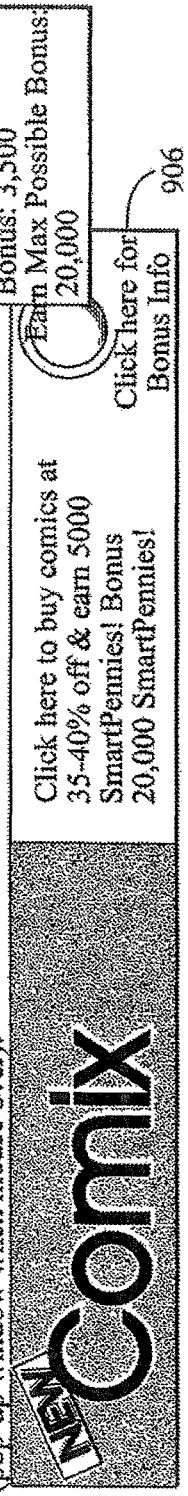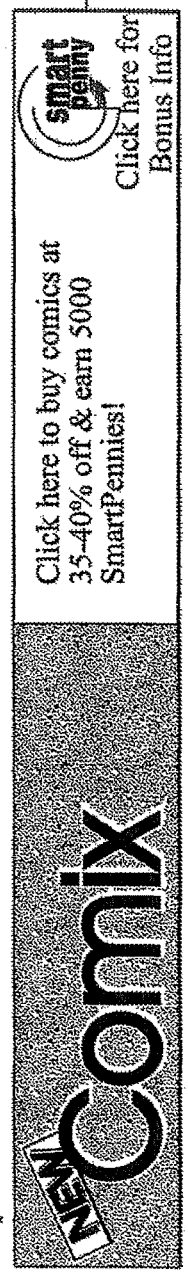
Fig. 9

Content Providers can politely ssolicit gratuity by
including the SmartTip™ button to their web pages.
An Example is shown below:
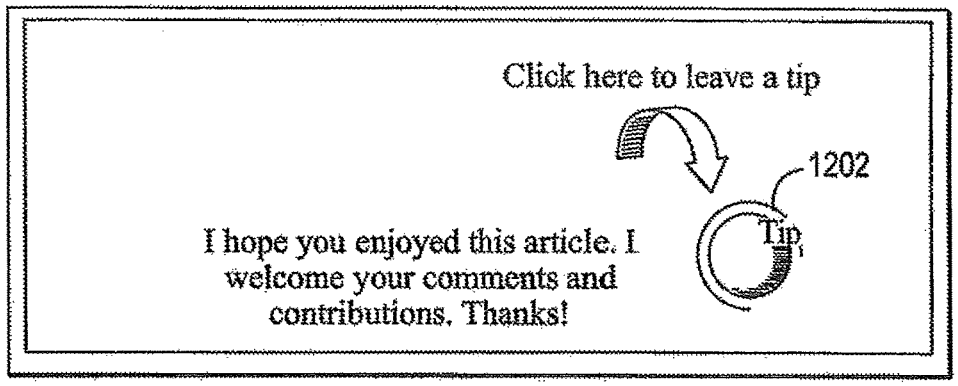
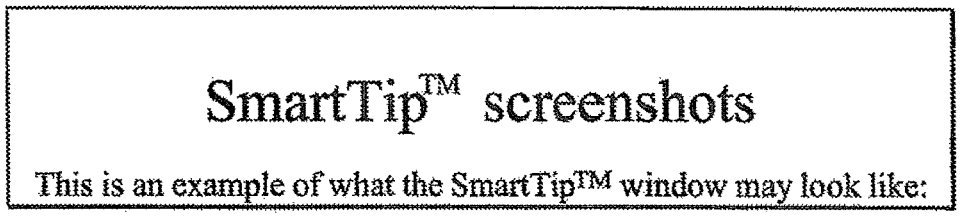
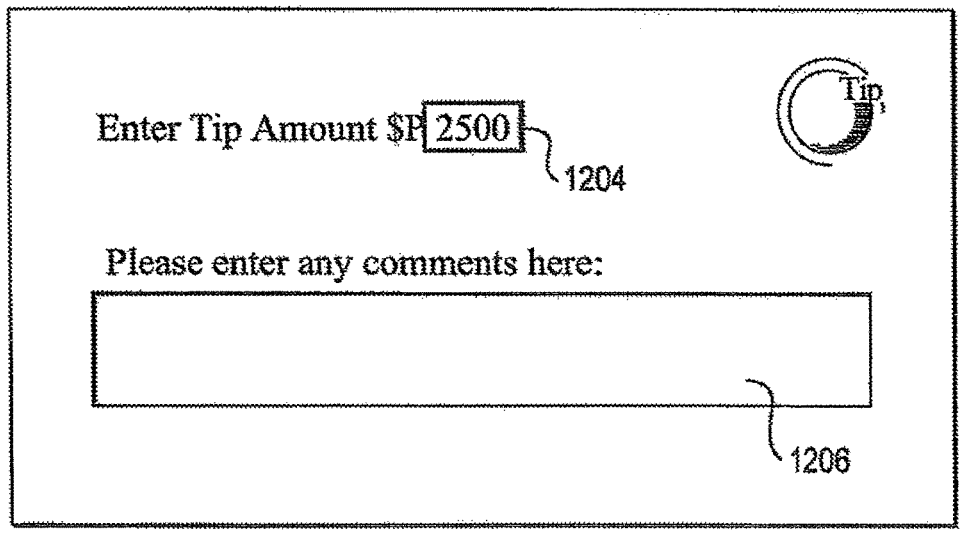
Fig. 12

Demographic Reward Matrix 1802

| Gender | Age | Six months of daily usage? (Due for vacation) | Show Banner? | Reward |
|---|---|---|---|---|
| MALE | Young | NO | NO | $ 1.50 |
| MALE | Young | YES | YES | $ 3.50 |
| MALE | Middle | NO | NO | $ 0.60 |
| MALE | Middle | YES | YES | $ 2.60 |
| MALE | Senior | NO | NO | $ 0.50 |
| MALE | Senior | YES | YES | $ 2.50 |
| MALE | None Given | NO | NO | $ 0.50 |
| MALE | None Given | YES | YES | $ 2.50 |
| FEMALE | Young | NO | NO | $ 1.10 |
| FEMALE | Young | YES | YES | $ 3.10 |
| FEMALE | Middle | NO | NO | $ 0.20 |
| FEMALE | Middle | YES | YES | $ 2.20 |
| FEMALE | Senior | NO | NO | $ 0.10 |
| FEMALE | Senior | YES | YES | $ 2.10 |
| FEMALE | None Given | NO | NO | $ 0.10 |
| FEMALE | None Given | YES | YES | $ 2.10 |
| None Given | Young | NO | NO | $ 1.00 |
| None Given | Young | YES | YES | $ 3.00 |
| None Given | Middle | NO | NO | $ 0.10 |
| None Given | Middle | YES | YES | $ 2.10 |
| None Given | Senior | NO | NO | $ - |
| None Given | Senior | YES | YES | $ 2.00 |
| None Given | None Given | NO | NO | $ - |
| None Given | None Given | YES | YES | $ 2.00 |

Fig. 18

Pass Through Percent: ⊙ 0%  ○ 25%  ○ 50%

URL: http://www.your

Returning Customer = "Yes"? $1.00

Keywords:

Keyword1: $0.25

Keyword2: $0.20

} 2002

Gender:

Household Income $50,0
$100,0

Example: Your_Company.com sets its bid levels to attract its target customers. With these settings, a new customer searching under "Keyword2" who is a 35 year old, married male, with two children and household income of $75,000/year and has made purchases from your site in the past will trigger a bid of $2.20, 0% of which will be passed on to the customer when he clicks to Your_Company.com's site.

Age:

Marital Status: 65+: $0.05

Married: $0.10

Single: $0.20

Children in Household: 0: $0.00

Amazon.com bids $1.50
Pets.com bids $1.10
SmallFry.com bids $0.50
CrazyEddy.com bids $1.00 and elects to pass 25% or $0.25 through to the visiting consumer Results display as:
    Site                                          Your reward for visiting 1. Amazon.com
        *The best books online*

2. Pets.com
        *The best pets online*

3. CrazyEddy.com                    $0.25
        *We're crazy! Try us!*

4. SmallFry.com
*We're small, but we try harder!*

Fig. 20b

ECONOMIC FILTERING SYSTEM FOR DELIVERY OF PERMISSION BASED, TARGETED, INCENTIVIZED ADVERTISING

CROSS-REFERENCE TO RELATED APPLICATIONS

This application is a continuation of U.S. application Ser. No. 14/028,506, filed on Sep. 16, 2013; which is a continuation of U.S. application Ser. No. 12/702,118, filed Feb. 8, 2010, now abandoned; which is a continuation of U.S. application Ser. No. 10/001,512, filed Oct. 31, 2001, now U.S. Pat. No. 7,660,737; which claims the benefit of U.S. Provisional Application No. 60/244,826, filed Oct. 31, 2000; and is a continuation-in-part of U.S. application Ser. No. 09/618,806, filed Jul. 18, 2000, now U.S. Pat. No. 8,527,337. The disclosures of the prior applications are considered part of and are incorporated by reference in the disclosure of this application.

FIELD OF THE INVENTION

The present invention relates to the field of Internet search engines and, in particular, to a scheme that allows users of such search engines to receive individually generated search results based on user profiles and key words.

BACKGROUND

The term "search engine" is generally meant to refer to a server or a collection of servers dedicated to indexing Internet web pages, storing the results and returning lists of pages that match particular queries (e.g., key word queries). A server is a computer, program or process that responds to requests for information from a client. On the Internet, all web pages are held on servers. This includes those parts of the search engines and directories that are accessible from the Internet. The indexes themselves are normally generated using spiders. A spider is that part of a search engine that surfs the web, storing the universal resource locators (URLs, i.e., the web addresses) and indexing the keywords and text of each page it finds. At present, some of the major search engines are Altavista™, Excite™, Hotbot™, Infoseek™, Lycos™, Northern Light™ and Webcrawler™. Note that the popular site Yahoo is technically a directory (a server or a collection of servers dedicated to indexing Internet web pages and returning lists of pages which match particular queries—directories, also known as indexes, are normally compiled manually, by user submission, and often involve an editorial selection and/or categorization process), not a search engine. The term search engine is nevertheless often used to describe both directories and search engines.

Generally, search engines return results based on key words or search strings that are supplied by users. Results are typically found by matching the key words or search strings with metatags present in the hypertext markup language (HTML) used to encode the web pages of the target web sites. Results are also often ranked according to the quality of the match between the metatags and the search strings. Depending upon the search algorithms employed by the search engine, the more frequently a term is used as a metatag, the more likely it is to be assigned a high ranking in the returned results. Owners of web sites therefore often repeat metatag terms numerous times (often using common spelling variations and similar terms) so as to ensure that their respective web sites will gain a high ranking when an Internet user executes a search. While this is beneficial for the web site owner (as it is likely an internet user will tend to select highly ranked results of a search), it is not necessarily beneficial for the user, who may be misled into selecting a less than desirable web site by such tactics.

With respect to present advertising systems on the World Wide Web (WWW), they may include a customized advertising repository server connected on the WWW, which can be accessed by a registered user through his or her browser. Advertising Repository. By providing the customized advertising server with personal profile information the user can control what advertisements will be available for the user's viewing and access. However, this only relates to users visiting a website to view ads. This scheme does not help users control the volume of advertising they receive (e.g., via email, cursor—selectable objects within browser, hyperlink in user browser to advertisement). Furthermore, this scheme does not help merchants target users for receiving advertisements.

Also, in current internet systems, consumers are able to select advertising based on subject filters. This allows consumers to receive only advertising that pertains to subjects of interest. However, it does not allow control of the volume of advertising delivered. Either the consumer must deal with an uncontrollable volume of advertisements, or the advertisement deliverer must editorially limit the volume of advertisements in ways that may not be suitable to the consumer. Similarly, merchants may target consumers to receive advertising based on personal profile information submitted by the consumer. The consumers may further be rewarded for reviewing such advertising. However, once again, the user is unable to control the volume of advertisements delivered. Furthermore, the merchant is unable to determine if adequate rewards are being offered to the user.

With respect to controlling user access technologies currently exist whereby a user attempting an internet operation may be recognized through a "cookie" previously provided to the user's browser during a previous interaction, or the user may be recognized through inputting an ID previously obtained. However, such schemes do not differentiate between automated users and human users. What is needed is a better method of differentiating between automated users and human users attempting an internet operation (e.g., sweepstakes entry, accessing an advertisement, creating an email account, etc.).

SUMMARY

In one embodiment, a method to control advertising messages directed at a user is provided. Such control might include setting a filter to control advertisements directed at a user. Advertisements are sent to a user based on the filter settings. The user may accept the advertisements. If the user accepts the advertisements, the user is provided with a reward.

In another embodiment, a method using a quiz to determine if a user is human or an automated respondent is provided. The user is presented with a quiz. The user is advised of the acceptable manner for responding to the quiz. The user's response to the quiz is received. A determination based on the user's response as to whether the user is a human or an automated respondent is made.

DESCRIPTION OF DRAWINGS

The present invention is illustrated by way of example, and not limitation, in the figures of the accompanying drawings in which like reference numerals refer to similar elements and in which:

FIG. 5 illustrates a user configuration matrix that may be completed by a user during a registration process in accordance with an embodiment of the present invention.

FIG. 6 illustrates an example of a user profile matrix that may be displayed to a user in accordance with an embodiment of the present invention and which shows available reward points and configuration options associated with various user profile information.

FIG. 7f illustrates an embodiment of a quiz described, which may be included in an embodiment of the present invention.

FIG. 8 illustrates a process for determining how frequently a user should be quizzed in accordance with an embodiment of the present invention.

FIG. 9 illustrates various manners in which bonus information can be displayed with banner ads in accordance with embodiments of the present invention.

FIG. 12 illustrates examples of user interface features that may be associated with gratuity sites in accordance with embodiments of the present invention.

FIG. 18 illustrates an example of a demographic reward matrix in accordance with an embodiment of the present invention.

FIGS. 20A and 20B illustrates an example of a reward matrix that may be used in accordance with an embodiment of the present invention.

DETAILED DESCRIPTION

Figure 1:
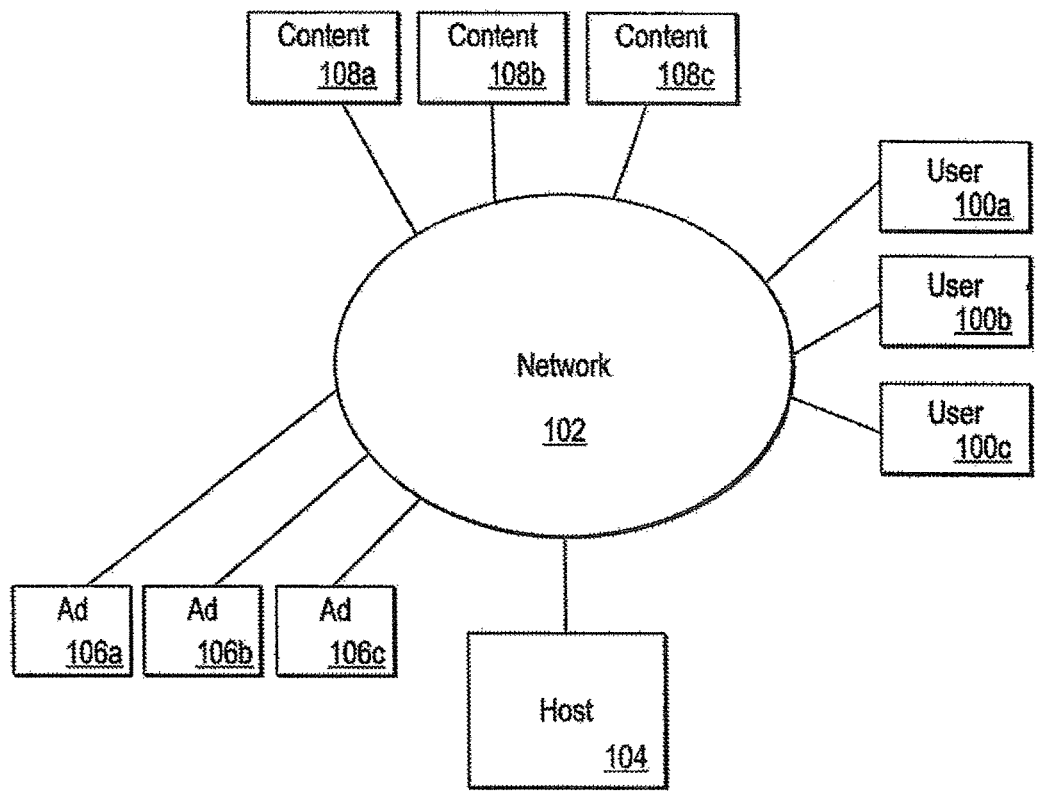
FIG. 1 illustrates a network architecture within which embodiments of the present invention may operate and be utilized.

A scheme that allows Internet users to take advantage of their individual user profiles in retrieving search results, viewing advertisements and/or performing other Internet-related activities is disclosed herein. Some embodiments of the present invention allow users to earn money, or credits, on-line by visiting certain web sites and/or viewing advertising on particular web sites. Such credits can be redeemed at content sites accessible via the Internet, exchanged for merchant gift certificates or airline miles, used as entries in sweepstakes and contests, used as payment for credit card balances, withdrawn as cash, and/or used as gratuities for the content providers. Furthermore, the system may allow users to use standard Web browsers such as Netscape's Navigator™, available from Netscape Communications, Inc., Mountain View, Calif., or Microsoft's Internet Explorer™, available from Microsoft Corporation, Redmond, Wash., and still access the features provided by the various embodiments of the invention.

In accordance with embodiments of the present invention, web site owners and/or advertisers can target their most desired audiences by setting higher rewards for specific demographic characteristics and thus "qualify" visitors to their site and/or viewers of their advertising. Further, advertisers can better control web-based advertising costs as demographically targeted advertising. The architecture of the system also allows content providers to assess micro-payments, e.g., small payments that may be less than $1.00 per item, for their content or provide a means for users of their web sites to leave them gratuities.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing, "calculating", "determining", "displaying", "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although discussed with reference to certain illustrated embodiments, upon review of this specification, those of ordinary skill in the art will recognize that the present methods and apparatus may find application in a variety of systems. Therefore, in the following description the illustrated embodiments should be regarded as exemplary only and should not be deemed to be limiting in scope.

Before describing various aspects of the present invention in detail, it is helpful to present some background relating to the Internet in as much as it is expected that several embodiments of the present invention will make use of and be deployed over this ever-expanding network of computer networks.

At bottom, the Internet may be regarded as a collection of devices linked together by various telecommunications media, enabling these devices (e.g., computer systems and the like) to exchange and share data, multimedia content and other information. Content sites accessible through the Internet provide information about a myriad of corporations and products, as well as educational, research and entertainment information and services. Literally millions people worldwide use the Internet on a daily or weekly basis.

A computer or resource that is attached to the Internet is often referred to as a "host." Examples of such resources include conventional computer systems that are made up of one or more processors, associated memory (typically volatile and non-volatile) and other storage devices and peripherals that allow for connection to the Internet or other networks (e.g., modems, network interfaces and the like). The precise hardware configuration of the hosting resource is generally not critical to the present invention, nor are the precise algorithms used to implement the services and methods described herein. Instead, the focus is on the nature of the services provided by the hosting resource.

In most cases, the hosting resource may be embodied as hardware and/or software components of a server or other computer system that includes an interface module, which allows for some dialog with a user; and that may process information through the submission of Web forms completed by the user. Generally, such a server will be accessed through the Internet (e.g., via Web browsers) in the conventional fashion. Operating in conjunction with the interface module may be a communication interface that supports the distribution of electronic mail (email) messages to or from other Web sites or users.

In order to facilitate communications between hosts, each host has a numerical Internet protocol (IP) address. The IP address is made up of four groups of numbers separated by decimals. For example, the IP address of a hypothetical host computer might be 123.124.78.91. Each host also has a unique "fully qualified domain name." The "fully qualified domain name" may not be repeated in the Internet. In the case of the hypothetical host 123.456.78.91, the "fully qualified domain name" might be "computer.domain.com".

In its most generic form, a fully qualified domain name consists of three elements. Taking "computer.host.com" as an example, the three elements are the hostname ("computer"), a domain name ("domain") and a top-level domain ("com"). A given host looks up the IP addresses of other hosts on the Internet through a system known as domain name service.

Domain name service is accomplished as follows: The Internet is divided into several "top level" domains. For example, ".edu" is a domain reserved for educational institutions, ".gov" is a domain reserved for government entities and ".net" is generally reserved for enterprises operating within the Internet. Although ".com" is short for "commercial," it is a catchall domain and is today the most popular one generally available to Internet users that have no special attributes, i.e., those that are, not a school, a government office or an Internet-based enterprise. Each domain name active in a given top-level domain is registered with the top-level server which contains certain hostname and IP address information.

As previously indicated, in order to access the Internet most users rely on computer programs known as "Web browsers." Commercially available Web browsers include such well-known programs as Netscape's Navigator™ and Microsoft's Internet Explore™. If an Internet user desires to establish a connection with a Web page hosted at computer.domain.com, the Internet user might enter into a Web browser program the uniform resource locator (URL) "http:www.domain.com". The first element of the URL is a transfer protocol (most commonly, "http" standing for hypertext transfer protocol, but others include "mailto" for electronic mail, "ftp" for file transfer protocol, and "nntp" for network news transfer protocol). The remaining elements of this URL (in this case, "www" standing for World Wide Web—the Internet's graphical user interface—and "domain.com") are an alias for the fully qualified domain name of the host computer.domain.com. Once a URL is entered into the browser, the corresponding IP address is looked up in a process facilitated by a top-level server. In other words, all queries for addresses are routed to certain computers, the so-called top-level servers. The top-level server matches the domain name to an IP address of a domain name server capable of directing the inquiry to the computer hosting the Web page. Thus, domain name service ultimately matches an alphanumeric name such as www.domain.com with its numeric IP address 123.456.78.91. Registration of domain names is currently handled by a variety of organizations.

A domain name server is a host computer with software capable of responding to domain name inquiries and accessible on a full-time basis to other computers on the Internet. Registering a domain name is the step that allows the top-level servers within the Internet to know where the domain name servers or hosts associated with those domain names are located in the Internet. Domain name service can be operated by the domain name holder or obtained from any entity with the proper computer equipment, including hundreds of Internet service providers (ISPs).

One way to establish a presence on the Internet is by placing a Web page, which is, ultimately, a computer data file on a host operating a Web server within a given domain name. When the Web server receives an inquiry from the Internet, it returns the Web page data in the file to the computer making the inquiry. The Web page may be a single line or multiple pages of information and may include any message, name, word, sound or picture, or combination of such elements. Most Web browsers will show somewhere on the screen the domain name of the Web page being shown and will automatically include the domain name in any printout of the Web page. There is no technical connection or relationship between a domain name and the contents of the corresponding Web page.

There are a number of ways for an Internet user to find a Web page. Web browsers feature access to various indexes, commonly referred to as search engines. These indexes will allow the user to enter a name or a word or a combination of words, and will return the results of the search as a list of "hyperlinks" to Web pages that have information within or associated with the document making up the page responding to the search.

A hyperlink is a link from one site on the Internet to a second site on the Internet. "Clicking" (or, more generally, selecting using a cursor control device such as a mouse, joystick, touch pad, etc.) on a designated space on the initial site which references the subsequent site by a picture, highlighted text or some other indication will direct the user's browser from the initial site to the second site. In addition to their use in indexes, hyperlinks are commonly placed on Web pages, thus allowing Internet users to move from Web page to Web page at the click of a button, without having to type in URLs. Hyperlinks are also used to initiate the transfer of files or other information from the hosting resource to the user's computer in a process commonly known as downloading.

Hyperlinks can be and commonly are established without reference to the domain name of the second site. A hyperlink is not technically related to a domain name and therefore it can be identical to an existing domain name without conflicting with that domain name. For example, where the operator of a Web page known as SITE to establish a home page at http: www.xyz.com, any number of indexes could be employed and hyperlinks could be established to bring up the page through use of the word SITE.

Some Web pages are referred to as Web forms. In general, a form is a collection of form fields displayed as a Web page by a browser in response to hypertext mark-up language (HTML) tags and other information received from a Web server. An associated form handler resides at the server to collect and process the information submitted by a user via the form. By using such forms, an information collection process performed by a host is made interactive with the users thereof. That is, users can add text to text boxes, select from drop down menus and/or select check boxes and/or radio buttons, etc. Typically, the user submits the form by clicking on a submit button or other appropriately labeled element of the form and, upon such submission, the contents of the form are passed to the form handler. Depending upon the type of information being submitted and the type of form handler being used, the information submitted by a user may be appended to a file maintained by the host, for example a file associated with a temporary account assigned to the user or a larger database. In this way information may be collected, processed and displayed to those who access it.

A text box is a standard form field into which a user can type text. When a form containing a text box is submitted in a Web browser, the name and contents of the text box are provided to the form handler running on the server. A check box field is typically arranged in a grid or matrix fashion with one or more cells of the matrix including a check box. Check box fields present a user with choices that can be made by clicking (e.g., selecting or deselecting as appropriate) a check box. Such fields are created and rendered using programming techniques common in the art and any number (including all or none) of individual check boxes may be selected or not. When a user submits a form containing a check box field, the name of each check box along with its value is provided to the form handler at the host. Radio button fields present a user with a choice that can be made by selecting a button. Radio buttons are displayed in a set, only one of which may be selected at a time. When radio button fields are created, they are assigned a group name, and each button in the group is assigned a value and an initial state (selected or not selected). When the user selects one of the buttons in the field, all other buttons in the field take on a value of not selected. Then, when the user submits the form, the group name and value of the buttons is provided to the corresponding form handler at the server for processing.

With the above background, aspects of the present invention may now be described. In general, the present invention may be regarded as a service that allows users (preferably registered users) thereof to earn and/or redeem credits on-line in exchange for sharing their personal or demographic information. Thus, users of the system (which may be regarded as a hosted environment embodied as computer readable instructions residing in computer-readable media associated with a computer system attached to/accessible through the Internet) are asked to provide demographic information which may be used to customize advertisements displayed to the user and/or search results from search queries posed by the user. In exchange for this information, the users receive credits which they can later redeem in various fashions as described below. To the users, the process is very similar to the customary actions they may be accustomed to in interacting with other search engine sites and/or web portals, with the exception that the use of rich demographic profiles allows for certain customizations that are not provided by other Internet-based services and systems. In addition, the present system offers unique features such as "quizzes" which can be used to validate a third party. These and other features will be discussed below.

A. System Architecture

A basic system architecture within which embodiments of the present invention may operate and be utilized is shown in FIG. 1. Users 100a-c are coupled in communication with a network 102. The network 102 might be the Internet, or some other type of computer network (e.g., a local or wide area network or a metropolitan area network) or network of networks. Through the network 102, the users 100a-c can access content sources 108a-c. For example, the content sources 108a-c might include servers and/or proxies hosting Web sites for entertainment, commercial enterprises, research journals, newspapers, and/or some other type of activity, business or interest. Advertisers, such as advertisers 106a-c, are entities that wish to place advertising and/or draw visitors to their sites. Some of the advertisers 106a-c may also be content providers. For example, a company such as Netscape™ might both advertise its portal service as well as provide content.

Host 104 is configured in accordance with an embodiment of the present invention and may also support the transaction or micro-payment system described below. As part of its operation, host 104 stores information about user accounts, e.g., for the users 100a-c. Host 104 may also provide advertisers 106a-c means to receive payment for qualified viewers, e.g., those meeting certain pre-established demographic criteria. Also, the host 104 may provide content providers means to receive payments for goods and services they offer either through a "pay-per-view" fee or a tipping (gratuity) scheme. For example, a content provider associated with content source 108a might offer access to a scientific journal hosted at that content source at for $0.50/article (or some other pay-per-use fee). Alternatively, the content provider might provide a hyperlink to a Web site (e.g., hosted by host 104) that allows users to provide a gratuity (e.g., so as to express their appreciation for a particular story or column). Thus, the host 104 acts as a transaction mediator for this system. The host 104 may be made up of one or more computers, a cluster of computers, a web or server farm, and/or some other configuration of one or more computers.

The remainder of the discussion below will assume that the network configuration shown in Figure I is used. Accordingly, embodiments of the invention (which may be computer software, hardware and/or combinations of both) are discussed as being hosted/provided by or from the host 104, although advertising content and hyperlinks to other reward-offering sites may be provided by other sources. In some cases the network 102 may be associated with multiple hosts 104 supporting embodiments of the invention. Depending on contractual arrangements between providers, credits earned on one system may or may not be valid on another. Aspects of the present invention will be described according to several systems and features as follows. Initially, user interface portions of the system will be described including process for registering with the hosting provider; searching for relevant web-sites, URLs or links; reading ads; tipping; bonuses; and other user portions. Subsequently, portions of the advertiser systems and features will be described; followed by a discussion of content provider systems and features.

B. User Systems and Features

Some embodiments of the present system offer a number of different features to support users thereof. The customer registration process will be described first, and then the ad viewing and searching processes will be described. Next, several additional features of the present system, such as merchant feedback and quality control processes, sweepstakes events, trading posts, the tipping process, the content consumption process and the bonus process will be described.

The invention provides, in various embodiments, a search engine returns results according to a ranking that is established according to user-supplied demographic information. In these and/or other cases, advertisements may be presented to users based on such demographic information. Accordingly, embodiments of the present invention offer user registration processes so that users might build rich profiles of themselves, allowing for customized search results to be returned by the search engine each time a search query is executed and/or to provide customized advertisement viewing. To enhance such features, embodiments of this scheme allow users to "sign up" (i.e., register and create a profile) quickly and easily (e.g., by completing one or more Web forms or similar data entry/collection devices). Some embodiments of the present scheme only require that a user select a username and a password (as is common in the Internet environment). This allows the registration process to be completed very quickly. Further, users that have registered via this quick start procedure can return at a later time to provide a more detailed registration profile and thus take advantage of the demographically-targeted search/ad presentation processes described herein. In some embodiments, users may be encouraged to provide these rich profiles by the promise of earning rewards (see below), among other features.

The basic registration process may be described as follows: New users may by referred to a service provider's Web site (e.g., hosted by host 104) offering a service configured in accordance with the plant invention and encouraged to "sign up", e.g., by information displayed at a content provider's Web site, various advertising for the service, the service provider's home page, and/or some other source.

Before being allowed to register, these new users may be asked to answer one or more questions of a quiz to test whether they are a human users or not (see the discussion of such Quizzes below). As indicated above, spiders are automated computer processes that are capable of searching the Web and retrieving Web page information. Variations of spiders known as robots or bots have been created that might allow for completion of a simple web form or other registration instrument, and thereby garner any rewards associated therewith without having to subject a human user to this process. To avoid abuses of the present system, quizzes may be introduced at various levels to thwart such automated processes and allow access only by live, human users.

When the new user arrives at a Web site associated with the present service, basic registration information is requested, such as a username and a password. This form of registration process is commonly used in the Internet environment to track users and allow for personalization of content to be displayed when the user returns to the subject Web site. In addition, the user may be invited to complete a more detailed registration card (really a Web form) that solicits more personal information about the user. In this way, the hosting service can build a rich user profile that will be useful when the user executes searches using a search engine associated with the present service and/or in determining which advertisements to present to the user.

Some embodiments of the present invention may include one or more sponsor advertisements in a registration window (e.g., a pop-up window that is rendered by the user's browser upon his or her first visit to the subject Web site). This advertisement may be associated with a service that rewards the new user for viewing the advertisement, and may also offer additional rewards for selecting (e.g., clicking through) on the advertisement, which may be rendered as a banner ad as is common in the art.

Some embodiments of the present invention allow a new user to earn additional credits or rewards by answering basic profile questions. As indicated above, answers to these profile questions may he used to build rich profiles that may be provided (perhaps for a fee) to third parties (e.g., advertisers) and/or used to provide customized responses to search queries.

Some embodiments of the present invention may allow a user to state a preference for viewing hyperlinks as URLs, text links, expanded text links or graphical banners. Responses to such inquiries may be used to further customize any returned search results.

In addition to usernames, passwords (or other personal identifier(s)) and demographic questions, a user may be provided with the ability to share certain elements of his/her system usage history to earn greater rewards. For example, the operator of a Web site devoted to travel may predict that a user who has had account activity every day for the past six months has not had a vacation in that time and subsequently choose to target such users aggressively. For those users that have opted to share such usage history, the travel site operator may provide generous rewards in exchange for this information. Users can selectively choose to provide such information, knowing that as a result they will be sharing what some might consider to be very personal information about their on-line habits. The benefit of sharing this information is the prospect of more appropriately targeted search results and/or greater rewards from merchants interested in such data.

The user may selectively offer to share elements of their on-line activity, for example, sharing that activity has occurred, but not the specifics of the activity; or sharing the knowledge that the user has earned rewards, but not disclosing the specific sites from which they were earned.

Some embodiments of the present invention may involve sending (e.g., by e-mail or surface mail or other delivery mechanism) a password to the new user. Similar to the quiz arrangement described herein, providing a password in this manner tends to ensure that only a live person (and not an automated computer process) will be able to respond correctly. For example, a message to the user indicating that, "Your password is the word that (is not an animal, or does not have a # in it) or is presented in a graphic" might be sent via e-mail in response to the user completing the registration process. If a user's e-mail viewer is not HTML-enabled (and so may be incapable of rendering an image), an alternative link a web site at which the image (in the case where the password is identified in an image as opposed to simply a text message) can be viewed may be offered.

Some embodiments of the present invention may involve automatically conveying additional information about the user, once the user has opted in, such as geographic location, local time, local current weather and/or the current activity of the user based on their electronic calendar (working, on vacation, off work, etc.).

Some embodiments of the present system may involve discovering, with the user's permission, what commerce sites that user has been a customer of Some embodiments of the present system may involve asking the user which site they came/were referred from and which Internet site is their favorite.

After creating the new user's account, a cookie may be placed on the user's computer system with the user's account information to enable automatic login for future sessions. A cookie is a general mechanism that server-side connections (such as common gateway interface scripts) can use to both store and retrieve information on the client-side of the connection. The addition of such a simple, persistent, client-side state significantly extends the capabilities of Web-based client/server applications.

Some embodiments of the present system may involve asking the user for their business demographic profile attributes such as the size of the user's company, nature of that business, its industry, the user's position/title in the company, his/her purchase authority, his/her business contact information, etc.

Some embodiments of the present invention include an Internet service configured to control advertising messages directed at a user. Such control includes setting a filter to control advertisements directed at a user. Advertisements are sent to a user based on the filter settings. The user may accept the advertisements. If the user accepts the advertisements, the user is provided with a reward.

Some embodiments of the present invention include a method for a third party to select registered users from an Internet service to receive advertisements from the third party. The method includes retrieving user profiles. The method further includes comparing user profiles with criteria defined by the third party. The method further includes sending messages to users matching the third party's criteria.

Depending on where the user was referred from the user may, at the conclusion of the registration process, be directed to an appropriate location (e.g., returned to the referring site or to another site related thereto). For example, if the user was referred from a content site, he/she may be redirected back to that site. Alternatively, the user might be presented with an ad browser to allow the user to view more advertisements and/or Web sites at which he/she can earn/redeem credits.

Registered Users Logging-in

When a registered user arrives at a Web site offering the present service, the system checks for the presence of a cookie such as that described above. If a cookie is present, the user may be automatically logged on; although, the user's password may be requested to verify his/her identity. If a cookie is not present, the user is asked to log in. The registration cookie can be a permanent cookie or session cookie according to the user's preferences. Such log in practices for registered users are customary in the Internet services arts and need not be described further herein.

Once a user logs in and/or when the user visits his/her account balance page, the user may be shown his/her current account balance (e.g., in terms of accumulated credits) either in a pop up window or in a fixed position of one or more Web pages. Such information may be rendered using active server page and/or Java™ technology common in the Internet arts. The login page may also provide the ability to allow a new user to log in and replace a previous user on the system.

Follow-Up Registrations

Registered users can return to their account at their convenience and update their profile information to reflect current information about the user and/or to provide additional information for which the user might receive higher bonus rewards and/or to update the user's contact information.

Users can complete each field of a web form to fill out their demographic profile by one or more of the following processes: Entering/selecting a field of the web form and accepting a default option of always sharing the specified information for demographic rewards and/or transferring the field value to an advertiser. Such items/values will always be submitted and the bonuses associated with the submission of such information will be received automatically. For example, a user may always want to reveal that he/she lives in a particular city and collect rewards associated with the release of that information. Entering requested information in a field of the web form and selecting a "submit on approval" option. By selecting this option, the user can decide on a case-by-case basis whether he or she wants to share the associated information for demographic targeting or the actual value of their profile. For example, a user may be willing to reveal that he/she lives in a group of zip codes (or even his/her actual zip code) to some web site operators/advertisers, but not to others. Leaving a field blank. For example, a user may never want to share information such as his/her e-mail or physical address.

Users can customize their automatic registration process by setting their local cookie duration to permanent, timed, or per session, as is common in the Internet arts.

Users can add to their account balance by attaching a credit or debit card to their account. That is, users may be permitted to add on-line credits by purchasing them using a credit or debit card. This allows users to make on-line purchases of goods, services or information without having to earn the credits by using other features of the rewards scheme described herein.

User account balances may be withdrawn. That is, credits earned on-line may be exchanged for monetary credit in the form of a check or credit posted to a credit card, etc. In some cases, credit may be issued by direct deposit to a user's bank account or other account (e.g., a money market fund or other account). If appropriate, time restrictions, amount restrictions, and/or a service fee may be charged for this service (e.g., the withdrawals may be limited to a certain monthly amount).

User account balances may be capped to encourage online spending. The cap may be increased on a per-user basis, based on that user's usage of their account over time. For example, a cap of $20 (or the equivalent number of on-line credits if credits are measured in units other than dollars) might be set, however a particular user might have a higher cap of, say $100 or some other amount, based on his/her past (frequent) usage. Caps may also be reduced, if appropriate.

Figure 17:
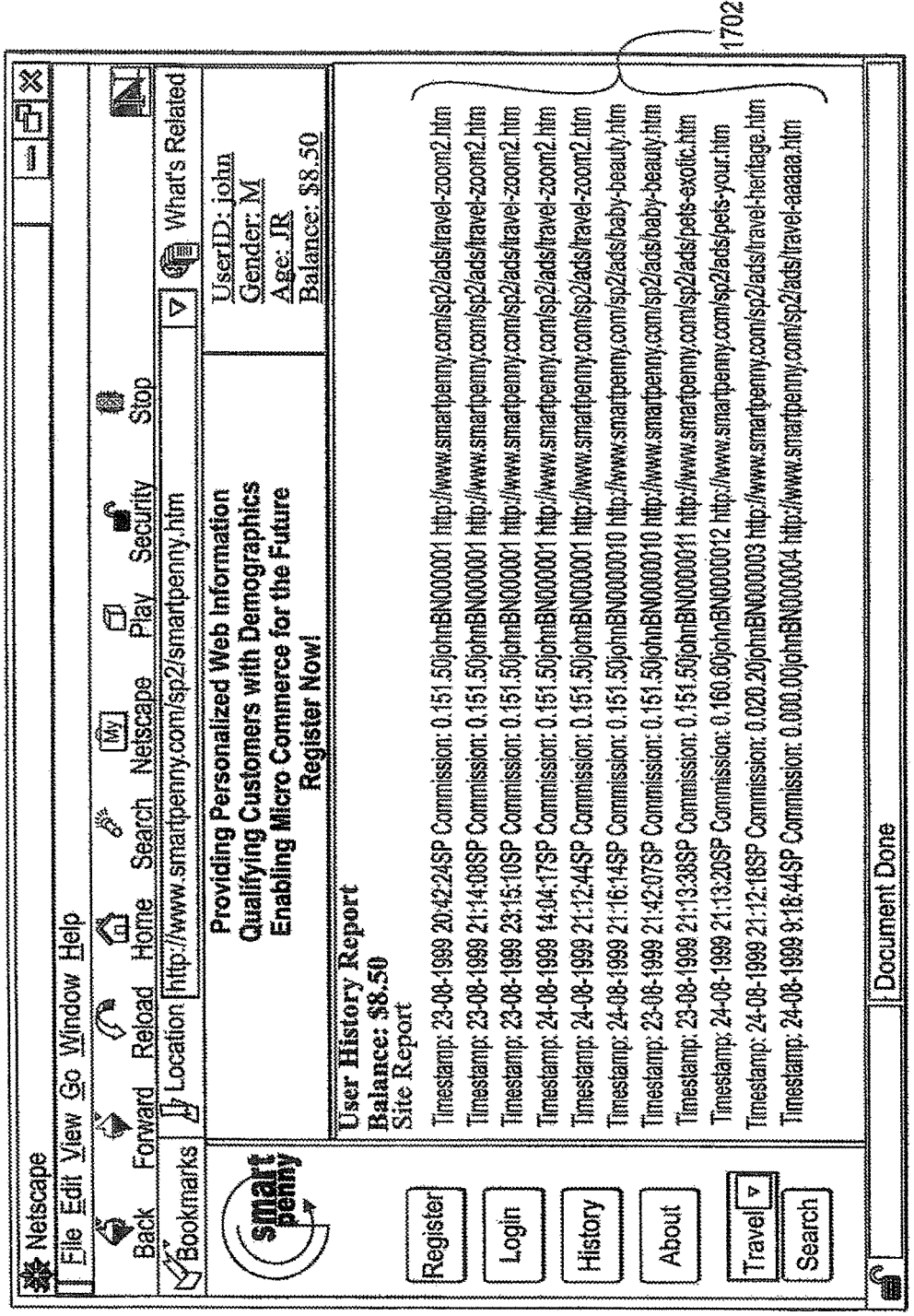
FIG. 17 illustrates an example of a user history report in accordance with an embodiment of the present invention.

Users can view their account balance and history. For each transaction, the content provider or advertiser Web site, transaction amount, time, resulting balance and/or other desired fields might be shown. (See, e.g., FIG. 17, which shows an example of a user history report 1702.)

Users may be permitted to access tools to evaluate site activity with respect to demographics, activity over time, responses to price changes and discounts.

The invention provides in various embodiments, an internet service and method which employs economic means for filtering that allows the consumer much more flexibility in controlling advertisement flow. Consumers are those who receive the advertising discussed.

Consumer Registration

Figure 2A:
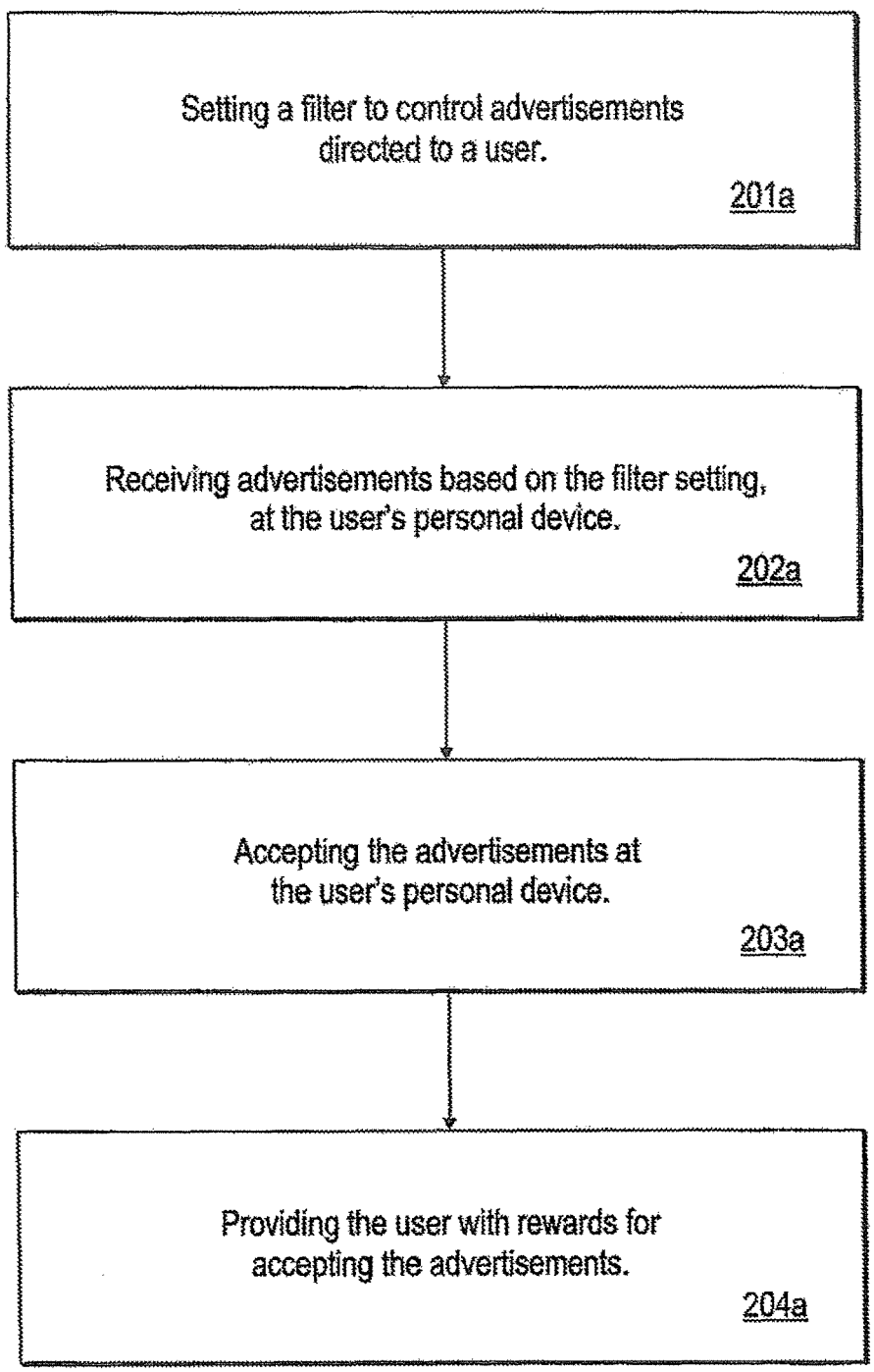
FIG. 2a illustrates an embodiment of a method for controlling advertising sent to a user and rewarding the user for advertisements reviewed.

As explained above, in an exemplary embodiment of the invention, the user creates a user profile. FIG. 2a illustrates an embodiment of a method for controlling advertising sent to a user and rewarding the user for advertisements reviewed. In one embodiment of the invention, a filter is set 201a to control advertisements directed to a user. The user will receive 202b advertisements based on the filter setting, at the user's personal device. The user may accept 203b the advertisement. Upon accepting the advertisement the user is provided 204b with a reward.

Figure 2B:
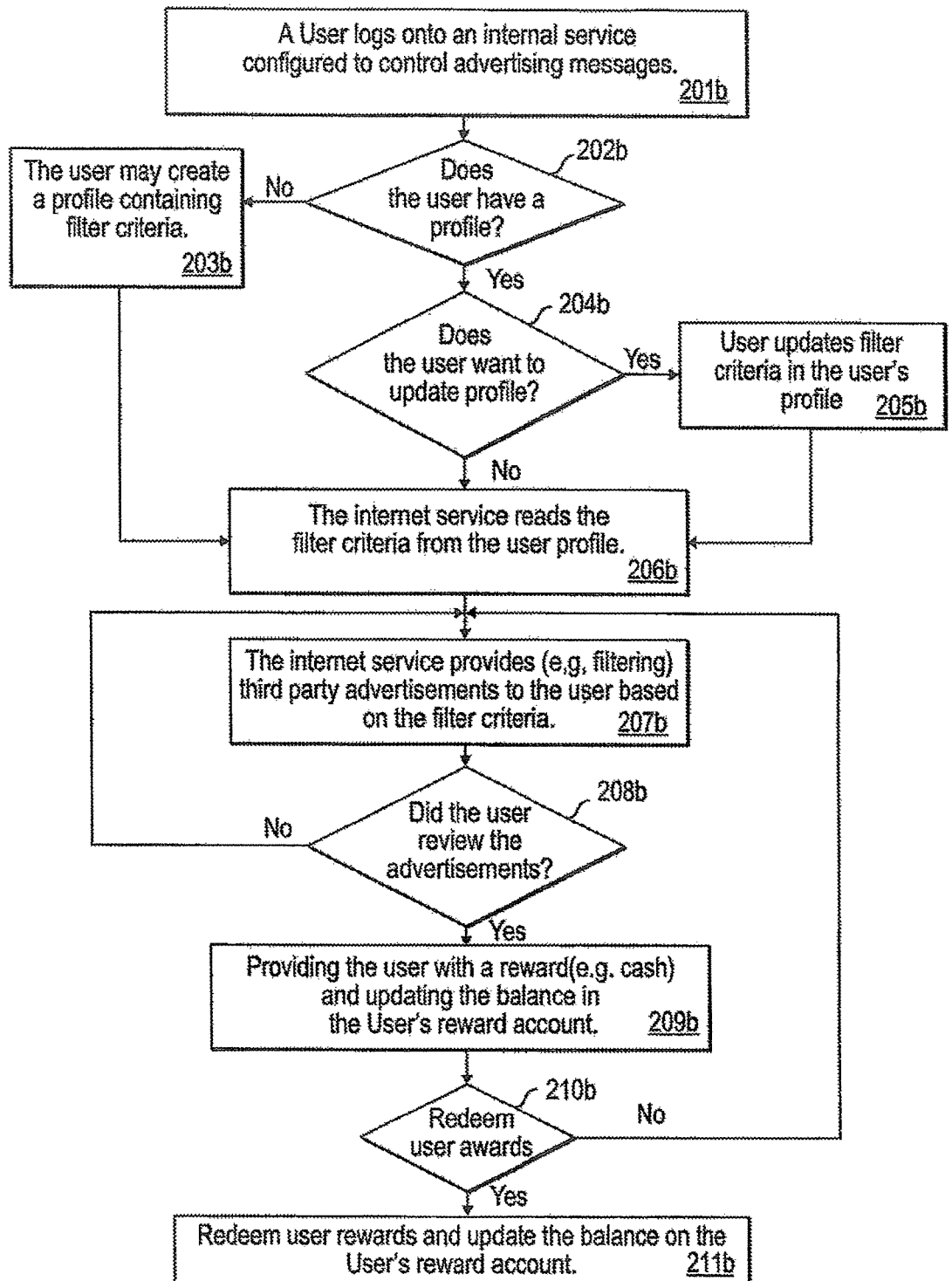
FIG. 2b illustrates an embodiment of a method for controlling advertising sent to a user and rewarding the user for advertisements reviewed.

Referring to FIG. 2b, illustrates an embodiment of a method for controlling advertising sent to a user and rewarding the user for advertisements reviewed. A user signs in 201b to an interact service configured to control advertising messages. The user may need to register with the internet service before signing in. The sign in process may require a user ID and password. After signing in a check 202b is made to determine if a profile exists for the user. The user creates 203b a user profile after the initial registration with the internet service. For basic registration, the consumer will provide personal demographic information, and subjects of interest along with the corresponding bid thresholds. The consumer selects areas of interest from a list, or enters a topic directly. The list is used to control advertisements sent to the consumer. The list can be in outline format, allowing the consumer to select either wide or narrow areas of interest. For example, a consumer selecting "Food" would receive all advertisements pertaining to that category. However, a consumer selecting a deeper, more narrow topic such as "Italian Food in my home town" would receive advertisements of a much more focused nature.

To further narrow the filter, the consumer also provides personal demographic information. This demographic profile may include both static and dynamic attributes. Static attributes are items such as gender, income, profession and family status. Dynamic attributes are such items as location, local time, whether the consumer is on work or personal time, local weather. The consumer can also agree to allow their behavior to be monitored in various ways in order to better target their interests. The consumer may be compensated for agreeing to allow this.

Also, the consumer may set a reward threshold in cash, minutes or some other unit of reward currency. The threshold is essentially a bid for the interruption of the advertisement. Any merchant willing to meet that bid threshold will pay the bid to the consumer in exchange for sending the advertisement.

For example, a consumer sets his threshold for "Food" at $1.00 will only receive advertisements from merchants willing to pay $1.00 for the consumers attention. The bid threshold may also be set to "none" in the case where the consumer never wants to receive an advertisement on that topic. The consumer can balance his interest in the subject with the cost of the interruption.

Several other dimensions may be used for the consumer to finely customize the manner in which they agree to receive advertisements. The consumer can adjust the bid threshold for time of day, even excluding certain times of day. With location information, delivery can be adjusted to comprehend the users local time, so ads meant to be sent at 5 PM will be sent at 5 PM local time.

The consumer can adjust the bid threshold for different media in which the advertisement is delivered such as plain text, recorded voice, live voice, graphics, streaming video, live streaming video.

The consumer can adjust the bid threshold for different manners of interruption. For example, No alert, the consumer has to visit a webpage to see waiting advertisements. A further example would be a visual alert whereby a visual cue that advertisements are waiting is presented to the consumer. In a further example, an audible alert is presented in which the consumer can hear an audio or tactile alert indicating that advertisements are waiting. In another example a Phone call where the device alerts the consumer to advertisements as if a live person were calling.

In addition to these dimensions, the consumer may adjust the bid threshold depending on the length of the incoming advertisement. A longer advertisement may warrant a higher bid. The consumer may set a flat rate for advertisements ($x per ad), a scaled rate ($y per minute), or fixed plus scaled ($x per ad plus $y per minute).

The display of pending ads may indicate the length of each ad in terms of bytes, minutes, screens, and keystrokes required to complete.

The consumer may set different bid thresholds depending on which of his personal devices he is using. For example, a consumer using a high bandwidth device may be more willing to receive long messages than when using his text pager.

The consumer may also set different bid thresholds based on the merchant, as well as excluding certain merchants from ever sending advertisements. The consumer may also request inclusion for any ad sent by a particular merchant above a certain bid level regardless of topic.

The consumer may also set the number of advertisements allowed to be sent in a given time window. For example, no more than five ads per day or up to three ads in the morning and up to two ads in the afternoon.

As consumers set up their account, the account guide will indicate to them the number of expected ads they will receive for the bid thresholds they set. In this way, the consumer can set the bid threshold based on the number of ads desired.

Once the consumer sets the initial bid threshold, each deeper detail of the bid threshold may be set by default value by the system. For example, full bid price for a phone call advertisement, 50% of the full bid for a voice message and 25% of the full bid for a text message Advertisement.

Bids may be set in cash currency or other reward tokens such as device minutes. The consumer on impulse may also pull an advertisement on any subject at any time without being compensated. In this case, the carrier may charge the merchant the merchant's full bid or a fixed rate.

Returning to FIG. 2b, a registered user may be asked 204b whether they would like to update 205b their profile. An Internet service may analyze 206b the filter criteria in the user's profile. The internet service provides 207b third party advertisements to the user based on the filter criteria. The user may choose to review or access the advertisements. The internet service makes a determination 208b as to whether the user reviewed the advertisement. In one embodiment, the user selection of a cursor selectable object is evidence that the user has reviewed the advertisement. In an alternate embodiment, the user opening an email message is evidence that the user has reviewed the advertisement.

A user who reviews an advertisement is provided 209b with a reward (e.g., cash) and the balance in the user's reward account is updated. The user may redeem 210b the user rewards. If the user redeems user rewards, the user's rewards account balance is updated.

In one embodiment, the consumer may have the ability to receive advertisements or purge them unread at any time. The consumer is only paid if the ads are received. In an exemplary embodiment, when a consumer sets the bid threshold, the consumer will be able to see an estimate of the number of advertisements that will be sent at that level.

Merchant Component

In current systems, merchants wishing to deliver advertising select their target audience and then depend on the ad deliverer. The ad deliverer may either send the ads freely, frustrating consumers with too many advertisements, or dilute delivery editorially. The embodiment described allows merchants to directly target individual consumers in a manner that guarantees that the consumer will be amenable to receiving the ad and there will be no missed targets. Merchants pay only for consumers who receive the advertisements.

Figure 3:
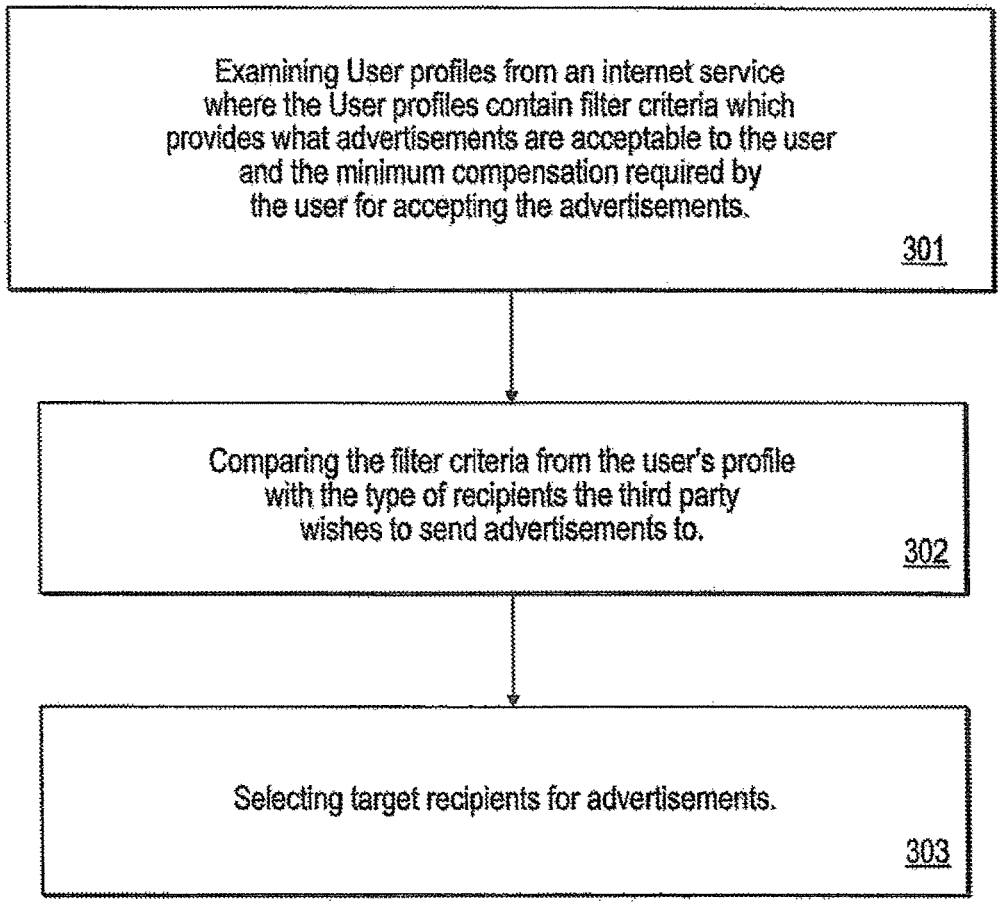
FIG. 3 illustrates an embodiment of a method for targeting users to receive advertisements as part of a rewards program.

FIG. 3 illustrates an embodiment of a method for targeting users to receive advertisements as part of a rewards program. Merchants may examine 301 user profiles to determine target recipients of their advertisements. The filter criteria from the user profiles are compared 302 with the type of recipients the third party (e.g., merchant) wishes to send advertisements. Merchants select 303 the target recipient of their advertising from the profile and interest matrix and then bid for the attention of those consumers. The bid level is 'up to' such that if a merchant bids $1.00, but consumers only request $0.50, the merchant only is charged $0.50 for that ad.

Merchants can also specify to send ads only to consumers who's interest level is above a threshold. For example, bid up to $1.00, but send only to consumers who's bid threshold is at least $0.75.

When consumers place a limit on the number of ads allowed per time window, the top n merchants based on their full bid will be sent. The consumer collects the full up to bid. Merchants will have the control over joining this full bid competition with a toggle switch.

If the number of merchants willing to pay full bid to be a 'top n' ad delivered is lower than the number the consumer has allowed, then those consumers will be placed in priority based on the size of their SmartPenny account and will pay what the consumer has set as threshold.

Once the merchant enters a bid level, the system will be able to predict an estimate of number of advertisements that will be sent at that level.

Constraints on Automated Usage

Computer systems configured in accordance with the present invention may limit or restrict the number of users which are allowed access from a particular computer or terminal based upon a certain number of cookies or Java applets installed on the user's computer or terminal. Such systems may also constrain automated access by allowing a limited number of users access from computers or other web-capable devices associated with certain unique identifiers such as a medium access control (MAC) addresses, IP addresses, or central processing unit (CPU) serial numbers.

Quizzes

The invention provides in various embodiments, a method of implementing Quizzes may be used as part of a process to verify that a user is a human, as opposed to an automated process (e.g., a bot or robot). Because users are paid per ad and/or site viewed, an automated system would be able to earn money or credits without the desired human actually viewing the advertising or visiting the site. Accordingly, some embodiments of the present invention make use of periodic quizzes, also called a SmartQuiz™, to verify that a particular user is a human. As noted above, these quizzes may be employed during the registration process to verify that a user is a human. Additionally, such quizzes can be used in conjunction with follow up registrations, and/or between transactions using some embodiments of the invention.

The basic premise is to design a quiz (or question) using a format that cannot be easily recognized or read by a machine or automated process. For example, text that is embedded in graphical representations such as an image could be used. The pictures can contain a simple question that any user would be expected to be able to answer. For example, the picture or other image form might have the text "123" drawn therein, and the quiz question might read, "What number is shown?" A separate text box or other data entry device rendered in the web page with the quiz question image could then be used by the user to enter his/her answer.

Because automated entities are not able to decipher the question (or more particularly, the answer to the question) from the image, such processes will not be able to respond correctly to the question. In contrast, because of the intentionally simple nature of the questions, almost any human could provide the correct answer. The object here is not to test the skill or knowledge of the user per se (although such tests could be used if appropriate to a given situation), but rather to ensure that some human being (and not just another computer system) is actually viewing the pages/ads being rendered. This way, advertisers are provided with some assurance that their advertising dollars are not being wasted.

The answers to the quiz questions may be provided using a text-input box located anywhere on the Web page containing the quiz image. For multiple-choice questions, the answers might be selectable from the image itself, e.g., using an image map, and/or through an HTML form surrounding the picture.

As stated, the question format is designed and optimized such that it will be difficult or impossible for automated entities to correctly respond and comparatively easy for human to correctly respond. Question may be given in any manner such as by text, audio, text, graphical images, tactile, olfactory and taste or in any manner that addresses any of the users five senses.

Figure 4A:
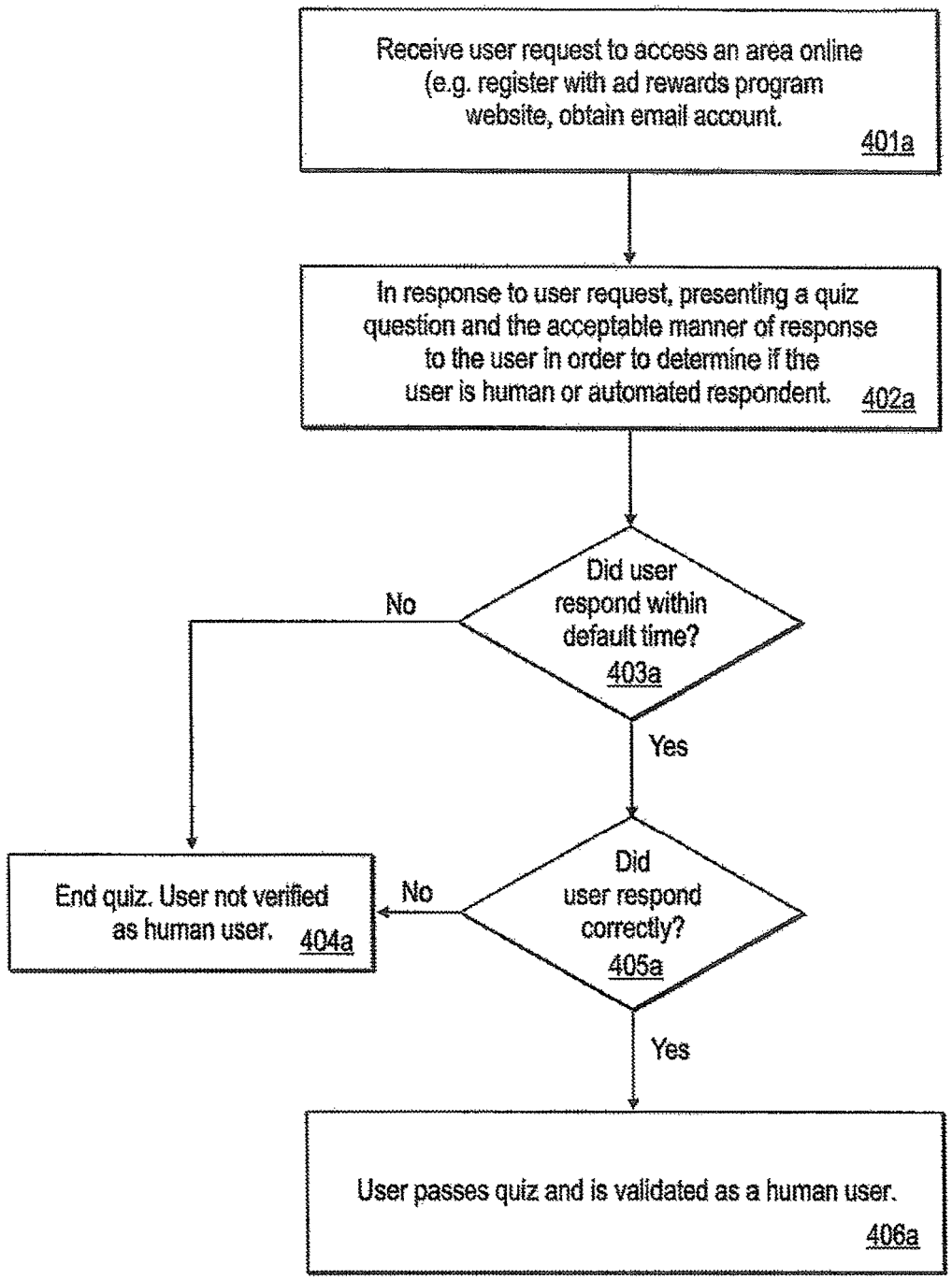
FIG. 4a illustrates an embodiment of a method for determining if a user is a human user or an automated respondent (e.g., quiz).

FIG. 4a illustrates an embodiment of a method for determining if a user is a human user or an automated respondent (e.g., quiz). A request is received 401a from a user requesting access to an online area (e.g., register with ad rewards program, sweepstakes, create an email account, etc.). In order to determine if the user is a human respondent or automated respondent, a quiz and acceptable manner of response are provided 402a. A determination 403a is made as to whether the user responded within the default time. If the user does not respond within the default time the quiz is ended 404a and the user is not verified as a human respondent. If the user does respond within the default time a determination 405a is made as to whether the user responded correctly. A correct response by a user to the quiz will validate 406a the user as a human respondent.

In one embodiment, the quizzes may include various formats of Audio questions. In one exemplary embodiment, quiz questions may be given over a background of other voices speaking such that to a human it will be clear what the question is. For example, a person speaking in a loud room, either quietly, loudly or moderately.

In a further exemplary embodiment, question may be given by the voice which is distinctive from the others in a way specified. For example, text or voice Will instruct "Answer the question given by the singing voice." or the happy voice, or the soft voice, or the female voice, or the old voice, or the young voice, or the out of breath voice, or the laughing voice, or the voice shouting from far away, or James Earl Jones impersonators voice. From a mix of overlapping voices, that voice's question will be selectable by a human.

In another embodiment, quiz questions can also be asked regarding attributes of the audio. For example, "Is the voice male or female?" "Is the voice speaking sensible English?" "Is the voice old or young?" "Is the voice loud or soft?" "Is the voice happy or sad?" "Is the voice singing well or poorly?" "Is the voice being funny or serious?" "Is the voice angry or happy?" "What song is the voice singing?" Simple true/false questions can be delivered by the person speaking. For example, a little girl asking, "Am I an old man?" a crying girl asking, "Do I sound happy to you?"

Figure 4B:
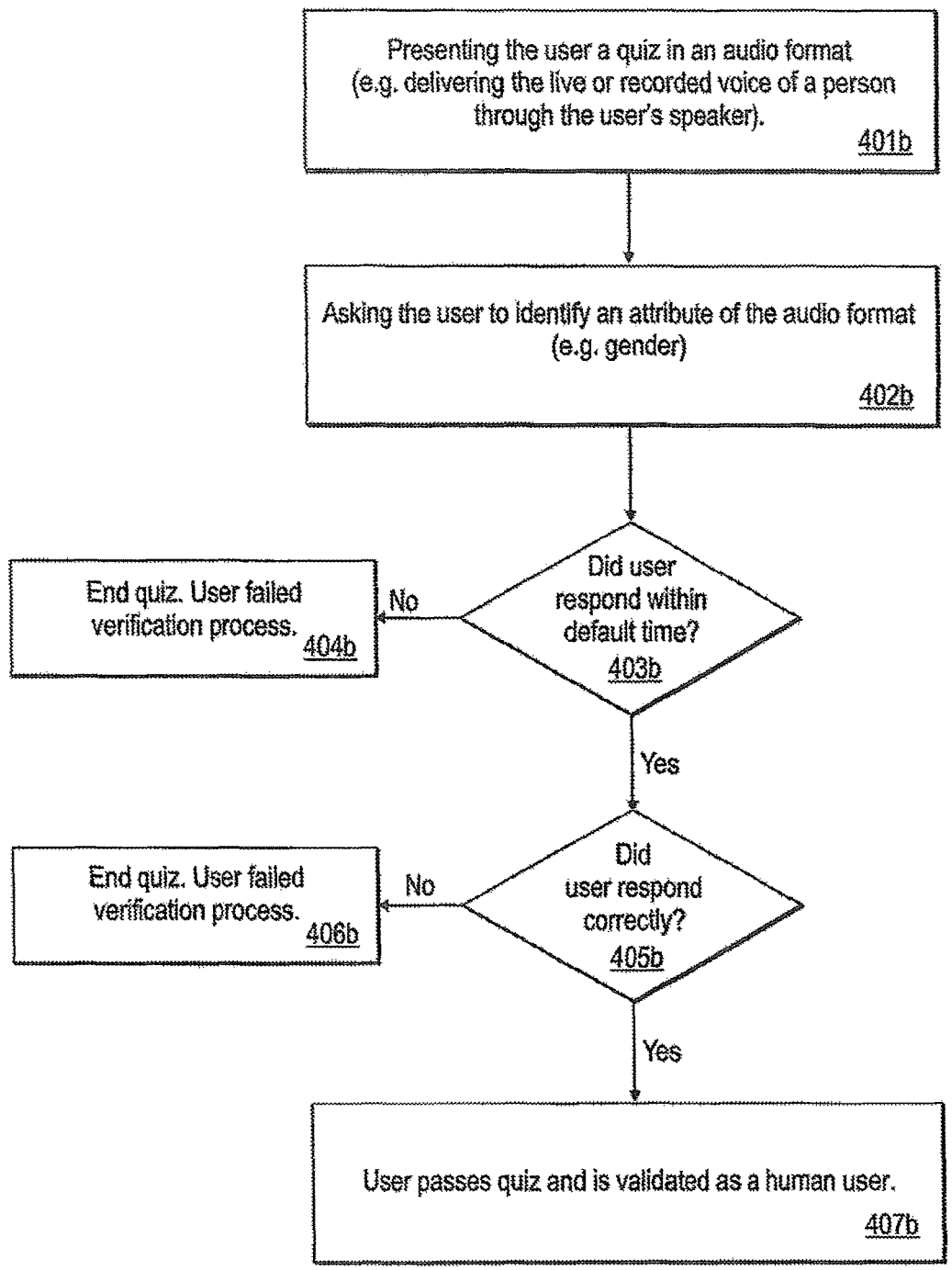
FIG. 4b illustrates an embodiment of a method of a quiz presented in an audio format.

FIG. 4b illustrates an embodiment of a method of a quiz presented in an audio format. In one embodiment, the user is presented 401b a quiz in an audio format (e.g., delivering the live or recorded voice of a person through a user's sound system). The user is asked 402b to identify an attribute of the audio format (e.g., gender). A determination 403b is made as to whether the user responded within the default time. If the user does not respond within the default time the quiz is ended 404b and the user is not verified as a human respondent. If the user does respond within the default time a determination 405b is made as to whether the user responded correctly. If the user does not respond within the default time the quiz is ended 406b and the user is not verified as a human respondent. A correct response by a user to the quiz will validate 407b the user as a human respondent.

In another alternate embodiment, quiz questions can be presented in a ransom note audio style. Ransom note audio style includes different people will speak single words in cadence. One will speak a meaningful word in the question while the others say some buffer word. For example:

Person 1: "Banana Type Banana Banana HAPPY Banana"
Person 2: "Please Banana Banana Word Banana Banana"
Person 3: "Banana Banana The Banana Banana Banana"

Figure 4C:
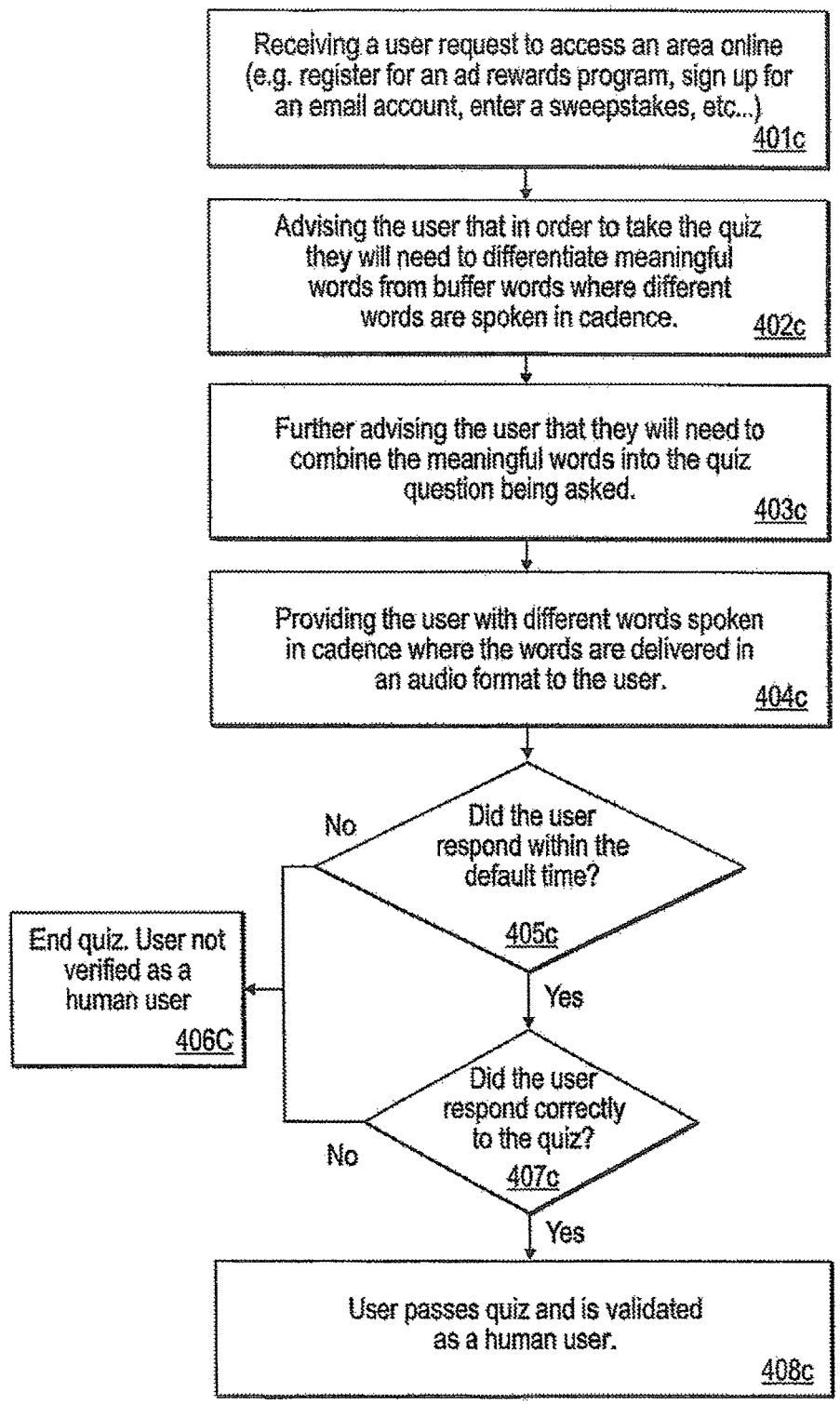
FIG. 4c illustrates an embodiment of a method of subjecting a user to a quiz question presented in a ransom note audio style.

FIG. 4c illustrates an embodiment of a method for subjecting a user to a quiz question presented in a ransom note audio style. An online system (e.g., sweepstakes) receives 401c a request from a user seeking access (e.g., user entry in sweepstakes, reading an advertisement, creating an email account, etc.). In order to access the online system, the user is advised 402c that they must take a quiz in which the user will need to differentiate meaningful words from buffer words where different words are spoken in cadence. The user will need to combine 403c the meaningful words into the quiz question being asked. The user is provided 404c with the ransom audio quiz (e.g., different words spoken in cadence where the words are delivered in an audio format to the user). A determination 405c is made as to whether the user responded to the quiz within the default time for response. If the user does not respond within the default time, the quiz is ended 406c and the user is not verified as a human user. If the user responds with the default time, a determination 407c is made as to whether the user responded correctly to the quiz. If the user does not respond correctly to the quiz the user is not 406c is not verified as a human user. If the user does respond correctly the user passes 408c the quiz and is validated as a human user.

In one embodiment of the invention, the quizzes may include various formats of Audio questions requiring a user to use one of their five senses (e.g., taste, smell, touch). A smell or taste can be generated by the system and the user will speak or select from images or key in the answer to a question regarding that smell. For example, "Is the smell pleasant or unpleasant?" "Does the taste match more with that of fresh bread or an ice cube?"

In one exemplary embodiment of the invention, question may be given via video using combinations of sounds and images to ask the question. For example, a person in the video may ask the user to enter the word written on the wall behind her when, there are other words written elsewhere in the picture. Several persons in the video may be speaking at once, some of whom are speaking grammatically correct but nonsensical English, and others speaking other languages, but all at the same volume level. A video with two people and a sign may have one person speaking instructions while a second person instructs the user to ignore the first person and follow the instructions on the sign.

Questions may be given that ask the nature of the scene described in the image, video, audio, olfactory, tactile or taste medium. For example, certain engine sounds and smells could identify a bus stop. Distinguishable familiar events such as a baseball game, a wedding, a taxi ride, eating a meal, grocery shopping, answering computer questionnaires or updating patent applications can be presented and questioned. For example, "Are the Yankees ahead or behind?" "Are the dogs barking?" "Are they eating steak or fruit?" "Is the wedding large or small?" "Is the baby awake or asleep?" "Is this New York or Los Gatos?" "Is it raining or snowing?"

In one embodiment of the invention, answers may be conveyed by keyboard or graphical interaction such as a mouse, audio response, or video. Answers will be designed such that humans will quickly and easily be able to respond while automated entities will have comparative difficulty responding.

In another embodiment, the quiz process may be integrated into advertising. For example, a text, image, audio, video, olfactory or taste based advertisement could be presented and then a question asked regarding the advertisement. "Which new car makes you heart go 'a-thumpa-thumpa-thumpa!'?"

Figure 4D:
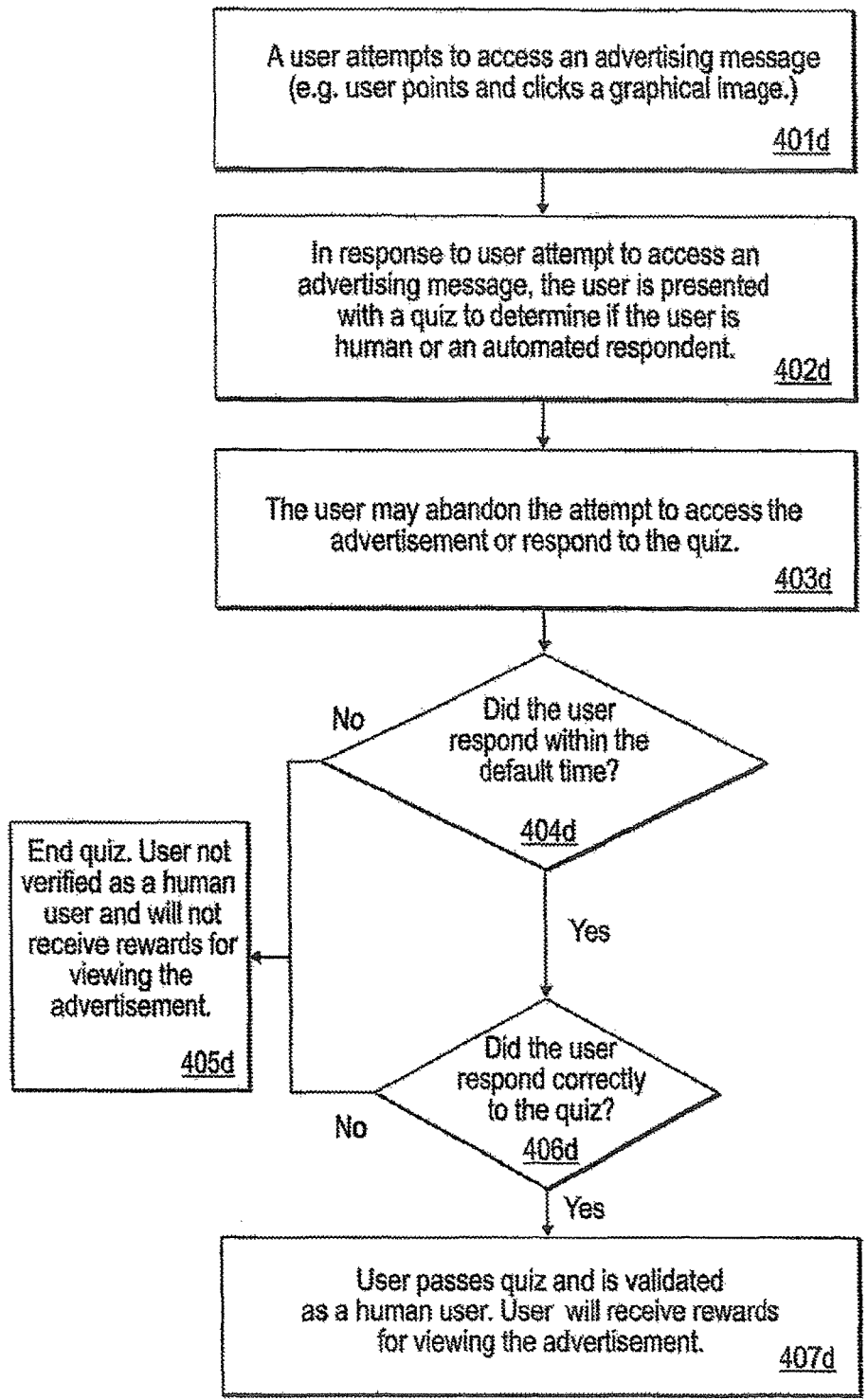
FIG. 4d illustrates an embodiment of a method for validating a respondent attempting to access or review an advertisement.

In a further embodiment, a quiz is used to determine if a human respondent or an automated respondent is attempting to access or review an advertisement. FIG. 4d illustrates an embodiment of a method for validating a respondent attempting to access or review an advertisement. A user attempts 401d to access an advertising message (e.g., user points and clicks a graphical image). In response to the user's attempt to access an advertising message, the user is presented 402d with a quiz to determine if the user is human or an automated respondent. The user may abandon 403d the attempt to access the advertisement or respond to the quiz. A determination 404d is made as to whether the user responded within the default time. If the user does not respond within the default time the quiz is ended 405d and the user is not verified as a human respondent. If the user does respond within the default time a determination 406d is made as to whether the user responded correctly. A correct response by a user to the quiz will validate 407d the user as a human respondent.

All questions and answers may be tailored based on a user's profile. For example, a different national anthem could be played for users in different countries. A poorly drawn map of the users location can be presented and ask the user to click on where they live. For example a San Francisco resident would be presented a map of the US that is rectangular and random contiguous shapes everywhere except for a close to proportional California, which he clicks on as his location. As the users intimate tastes are better known, the question can be which music clip is his favorite (Ozzy Osbourne or Lawrence Welk) or "Who is better, Kirk or Picard?" In another example, based on the users profile, a simple questions such as "What is your gender?" might be asked. In response the user would select from a graphical list of words, among which will be "male" and "female".

Therefore, the quiz process is an authentication process that may be used in any application to distinguish between human and automated respondents such as any form of registration, login, commercial transactions, contest entry, voting, communication or electronic signature.

Figure 7A:
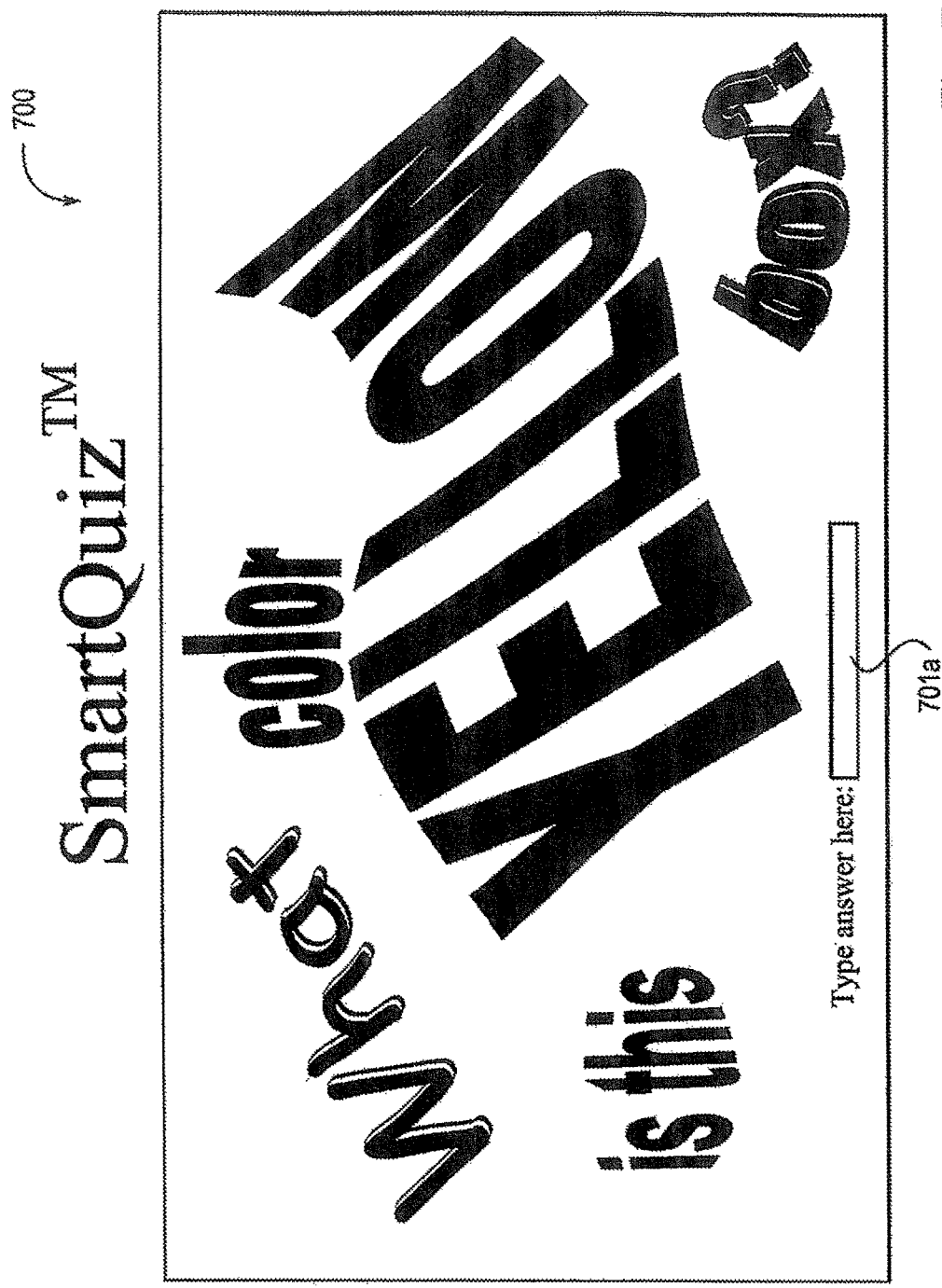
FIG. 7a illustrates a Twisted text recognition quiz, which may be included in an embodiment of the present invention.

FIGS. 7a-7f illustrate various types of quizzes, any of which may be used in combination with one another or individually. FIG. 7a illustrates a Twisted text recognition quiz. Referring to FIG. 7a, a simple question is presented in text that is twisted (i.e., displayed in a non-linear fashion) to make optical character recognition (OCR) difficult, while still remaining easily readable to a human. In one embodiment the user would answer the quiz 700a by typing the answer to the quiz 700a in the space provided 701a. The user would then hit the enter button on their keyboard. In alternate embodiments the user would choose a user-selectable object with a mouse. In further alternate embodiments, the user would answer the question with a spoken response through a microphone.

Figure 7B:
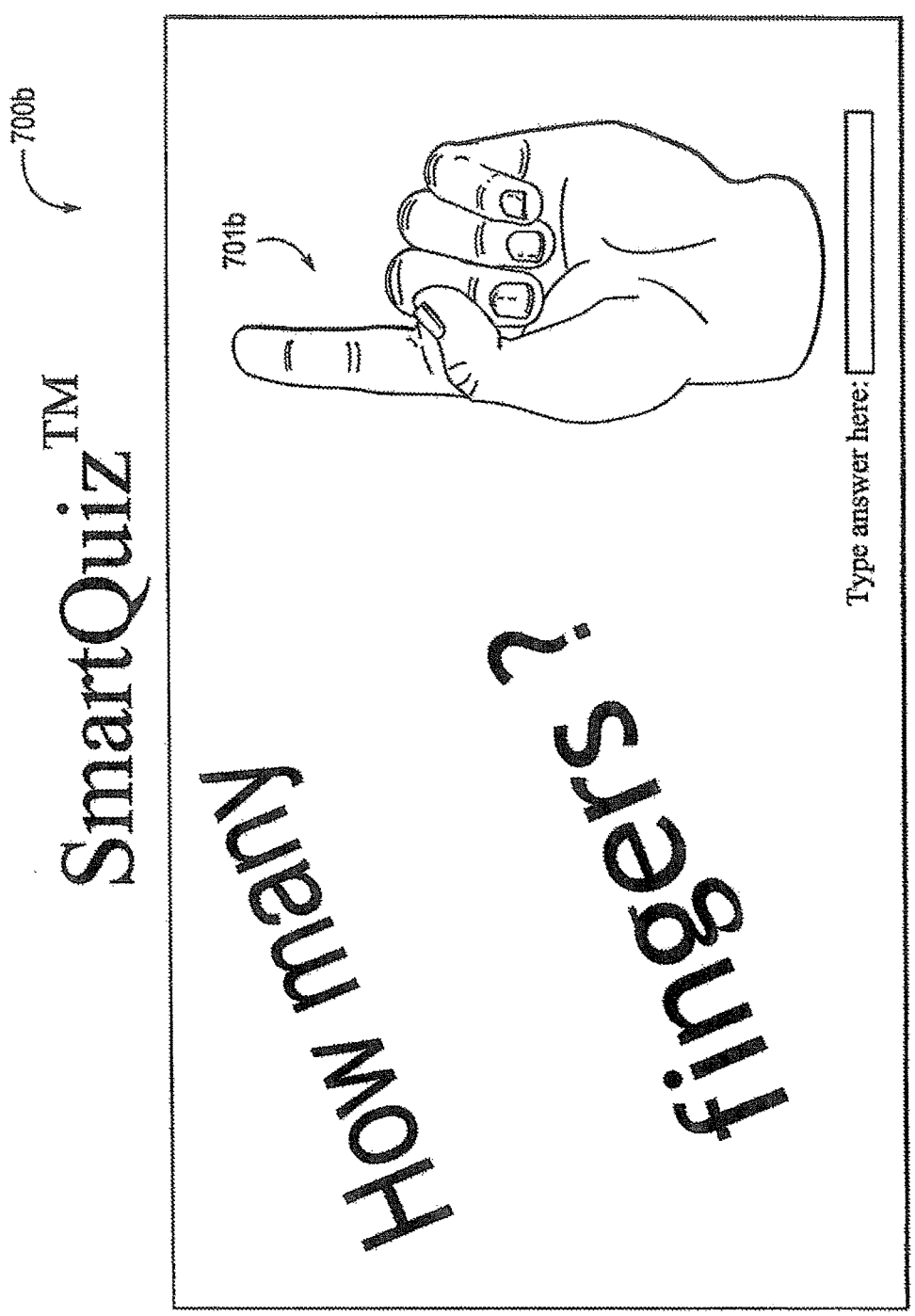
FIG. 7b illustrates a word/image interpretation quiz, which may be included in an embodiment of the present invention.
Figure 7C:
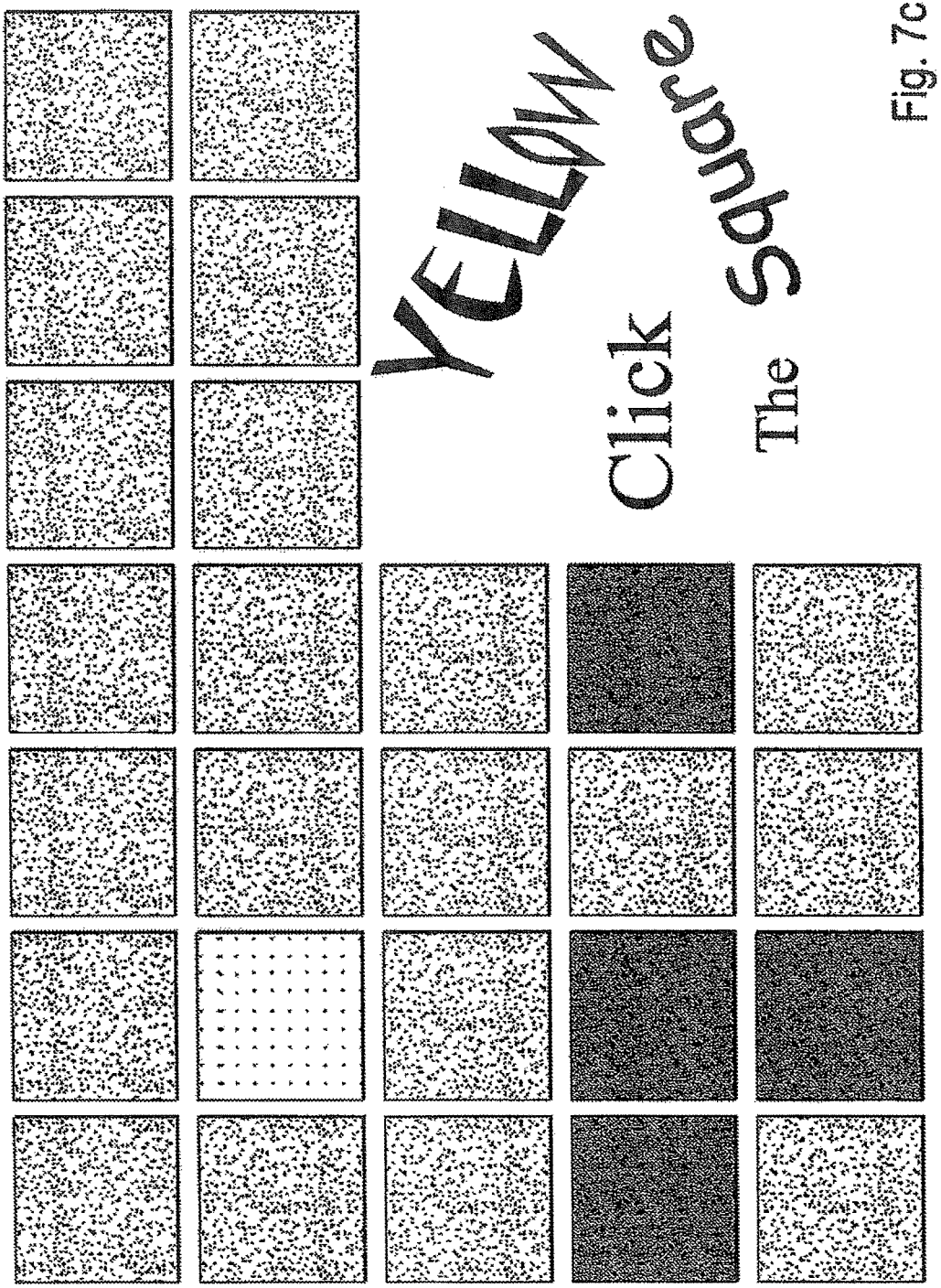
FIG. 7c illustrates an embodiment of a quiz described, which may be included in an embodiment of the present invention.
Figure 7D:
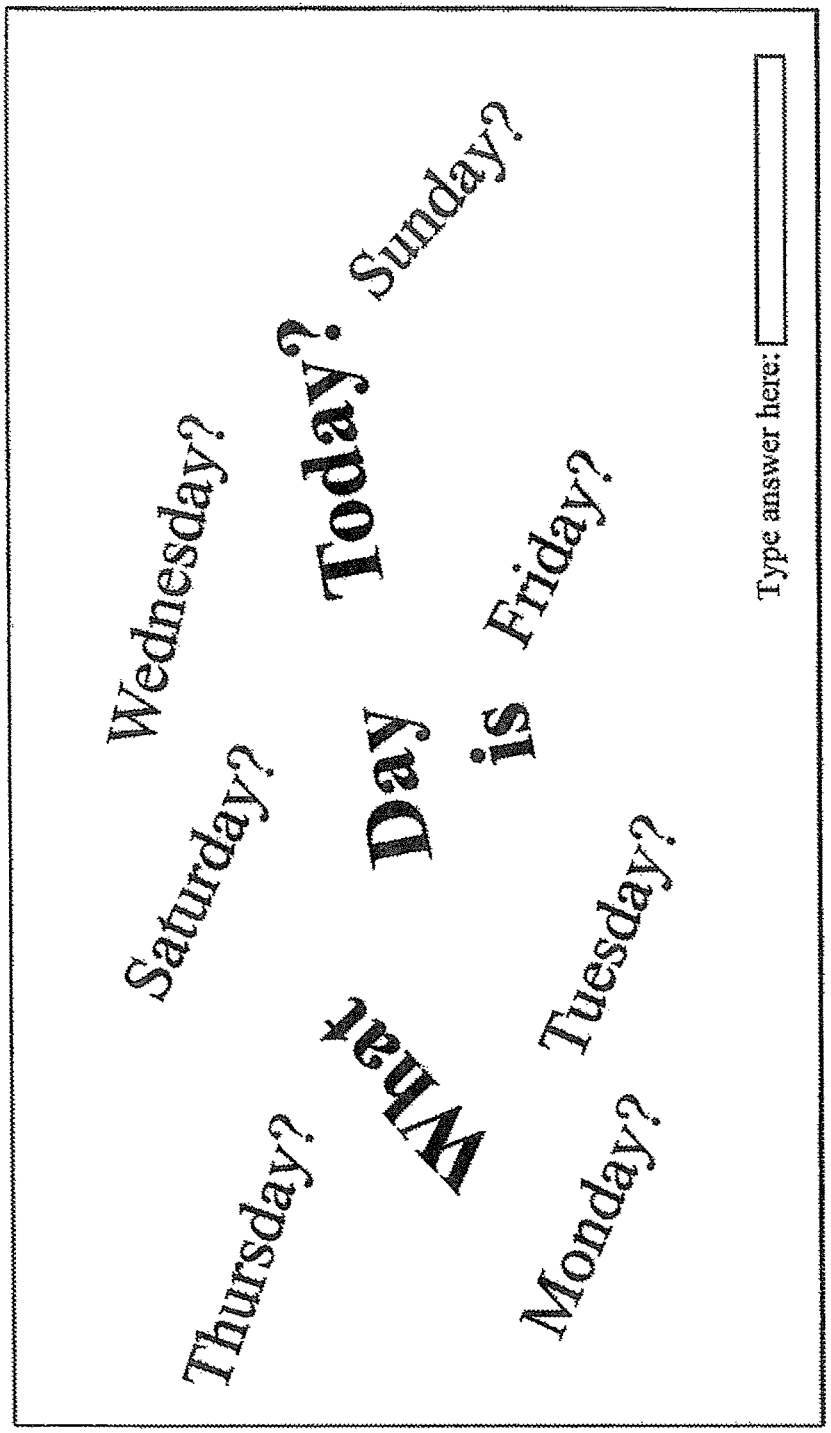
FIG. 7d illustrates an embodiment of a quiz described, which may be included in an embodiment of the present invention.
Figure 7E:
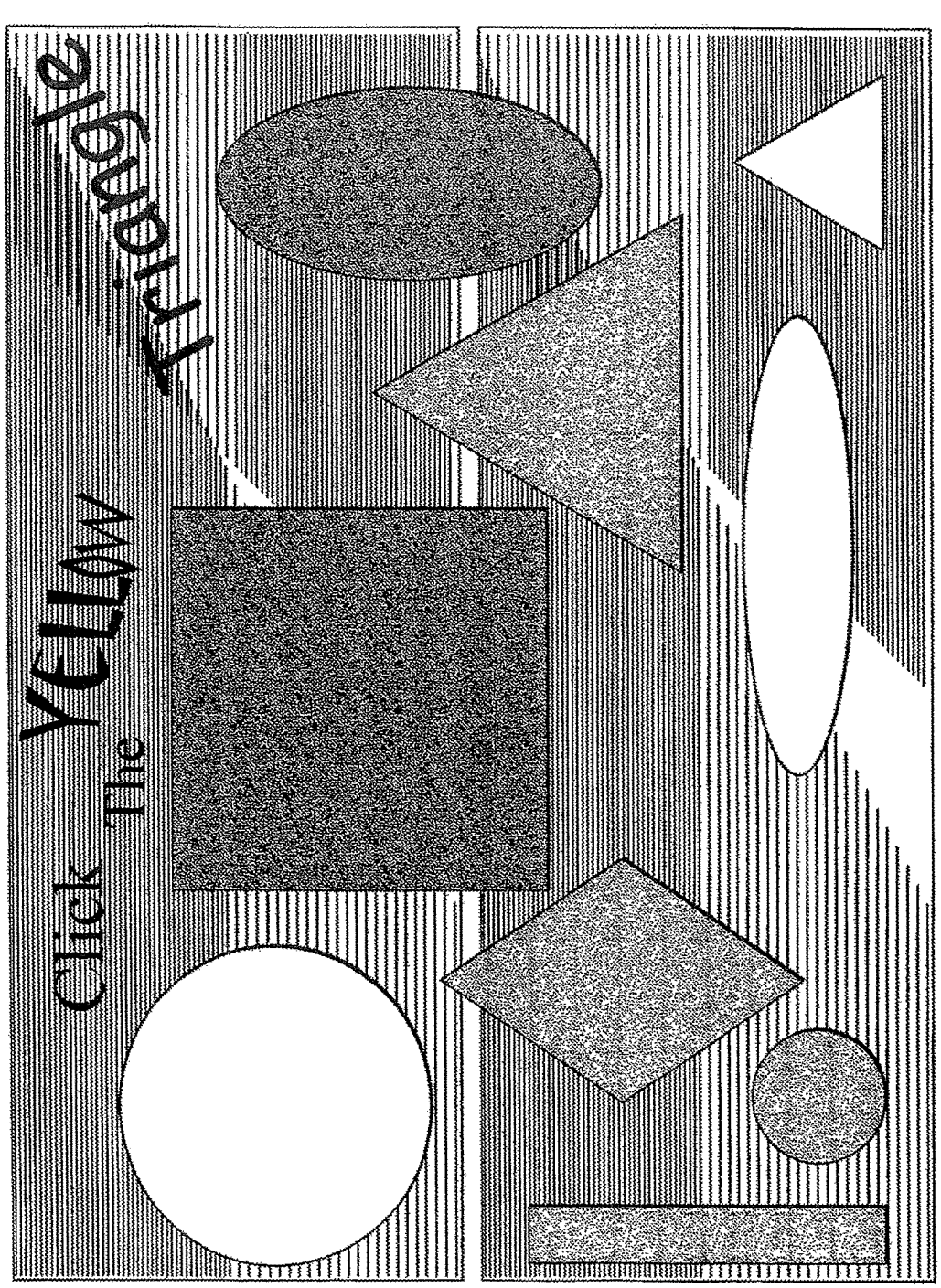
FIG. 7e illustrates an embodiment of a quiz described, which may be included in an embodiment of the present invention.

FIG. 7b illustrates a word/image interpretation quiz 700b. A user is presented with a picture of a hand holding up one finger and asked "How many fingers?" The quiz in 700b is also known as a simple word/object identification quiz. The name of an object or other word is spelled out in graphical text or a picture of an easily recognizable object is displayed, for example a dog, a book, a car, the word "Ice Cream", etc. Users are asked to enter (e.g., in a text box) the name of the object in the space provided, or, are asked to select the correct picture or word matching the object displayed. Users may also be asked to identify the one object that does not belong in a set of objects being displayed. Quiz 700b may also be known as a number recognition quiz. The number 701b is presented graphically. The number can be generated randomly or from tables.

Other recognition examples include color recognition. A color is presented and the user is asked to identify it. Shape recognition. A user is asked to identify the shape presented (e.g., a triangle, a square, etc.). Self-answering questions. Text or graphical questions that contain their own answer. Short question, short answer. The user simply types the word presented in the image. Simple counting. A number of similar object are displayed, such as 2 balls, 4 birds, 1 finger, etc. Users are asked to enter (e.g., in a text box) the number of objects being displayed, or are asked to select the picture, word or number matching the object displayed. Users may also be asked to select the set of pictures showing the same number of objects.

Simple computations. Using numbers or objects or a text description, users are asked to perform simple calculations such as 1+1, 2*2, "4 divided by two", "XXXX minus XX" (where X is an integer, etc.). Users are asked to enter (e.g., in a text box) the correct answer to the mathematical expression, or are asked to select the correct answer represented in a picture, word or number. Users may also he asked to select the set of pictures showing the same mathematical results. For example, the question may display "2 cats+2 dogs" and the correct answer may be "2 cats+2 dogs".

Simple queries (e.g., FIGS. 7a-7t). Users are asked simple questions using graphical text. Responses may be entered as text or selected by "clicking" (e.g., using a cursor control device such as a mouse) on the right area. Examples of questions that might be used are: "What day is today?" (e.g., FIG. 7d), "How old is a 2-year old baby?", "What color is red?", "Is ice cream hot or cold?", etc.

Awareness. Users are asked questions about the real world, e.g., "What day (month, year) is it?" Click on a Designated Object/Space. Users are asked to select a particular image (See, e.g., FIGS. 7c and 7e.).

In one exemplary embodiment, a user is asked to select an easily recognizable image from an array of less-distinct images. FIG. 7f illustrates a quiz in which a user is asked to select a baby picture from an array of less-distinct images. In the quiz 700f, a user is asked to click 701f the baby picture 702f. In one embodiment, a correct response would require the user to position a mouse pointer over the baby picture 702f and click the baby picture 702f.

In an exemplary embodiment of the invention, users may be quizzed with reduced frequency as they respond accurately and with increasing frequency as they fail to respond accurately. For example, FIG. 8 illustrates a process 800 wherein a new user starts (step 802) and is presented with SmartQuizzes at various intervals (step 804). As each quiz is taken (step 806) a determination is made as to whether the user passed the test. If so (step 808), the interval is adjusted (step 810) until a maximum interval is reached. If the user fails a test, a retest might be offered (step 812). Passing the retest also resets the testing interval (step 814). Failing the retest (step 816) suspends the user's account for a designated time interval or causes some other penalty.

Search Engine

Some embodiments of the present invention include a search engine that allows a user to search for merchant sites, links, ads and content relevant to their interests. Search results can be sorted according to relevance, reward value, popularity, and/or other criteria. The following describes the search process:

A user selects the search engine from a web site configured in accordance with an embodiment of the present invention and enters or selects the search keyword(s).

If the user is not logged in, he/she will be directed to the login/sign up pages, but guests may still be permitted to use the system without logging in (and without receiving the rewards offered to registered users).

Figure 13:
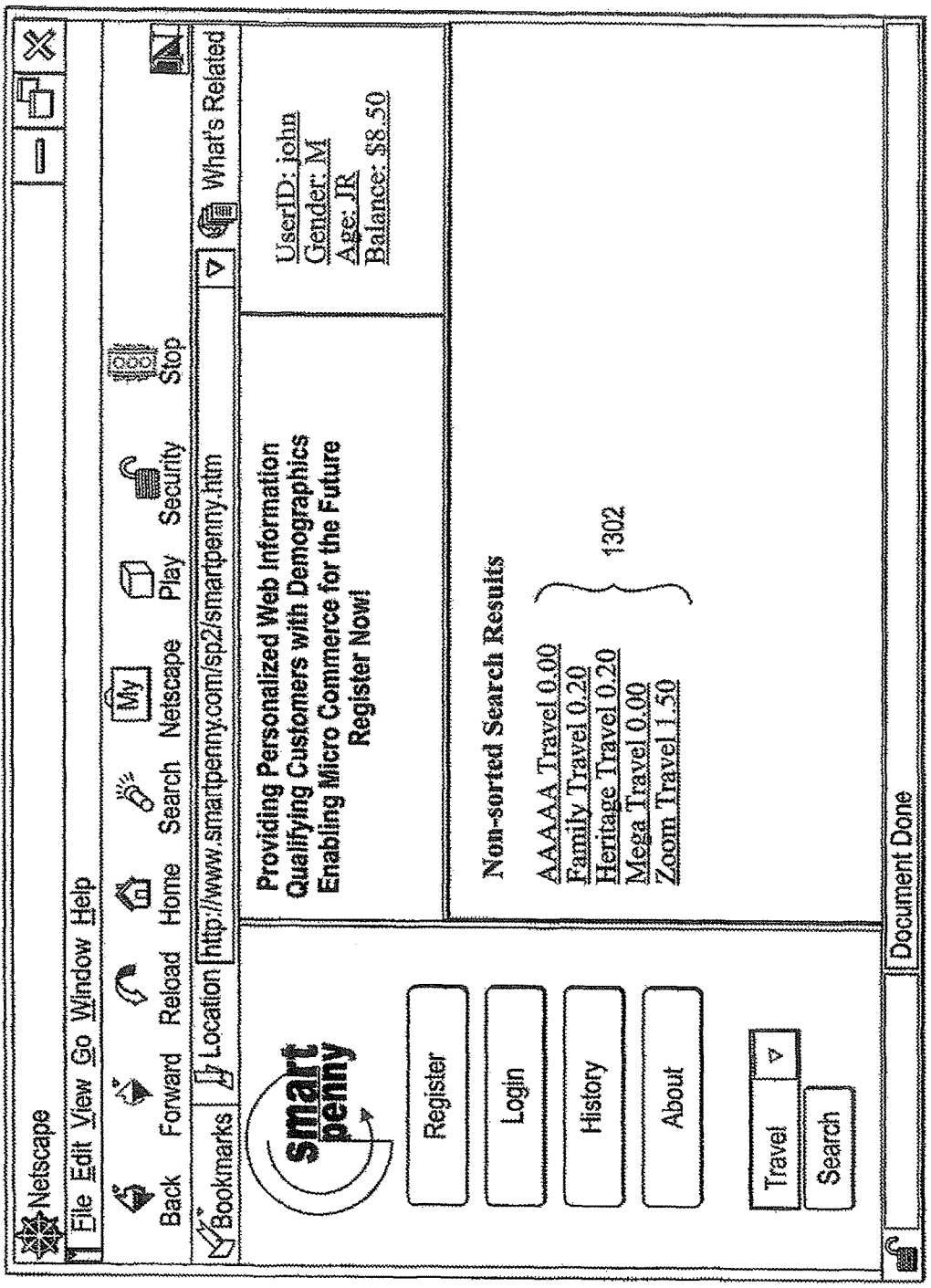
FIG. 13 illustrates a search result that might be returned after a conventional (i.e., non-demographically sorted) search for travel sites.

If a user is not logged in, he/she will be able to perform searches, but without the benefit of receiving the rewards (e.g., for the release of demographic profile information) and without receiving search results having a corresponding sorting. See, e.g., FIG. 13, which illustrates a search result 1302 that might be returned after a conventional (i.e., non-demographically sorted) search for travel sites.

Figure 14:
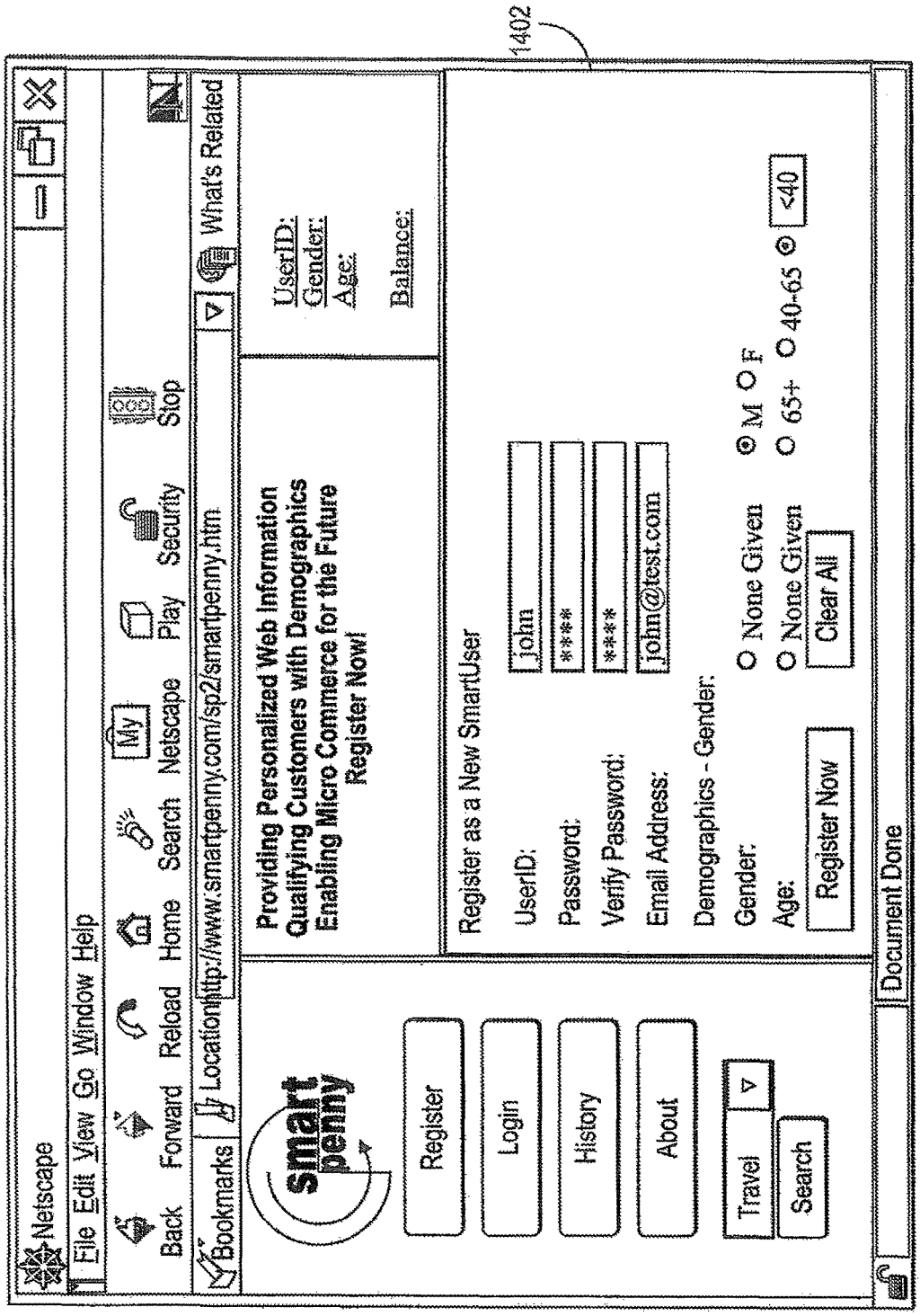
FIG. 14 illustrates an example of a registration sign-in screen in accordance with an embodiment of the present invention.
Figure 15:
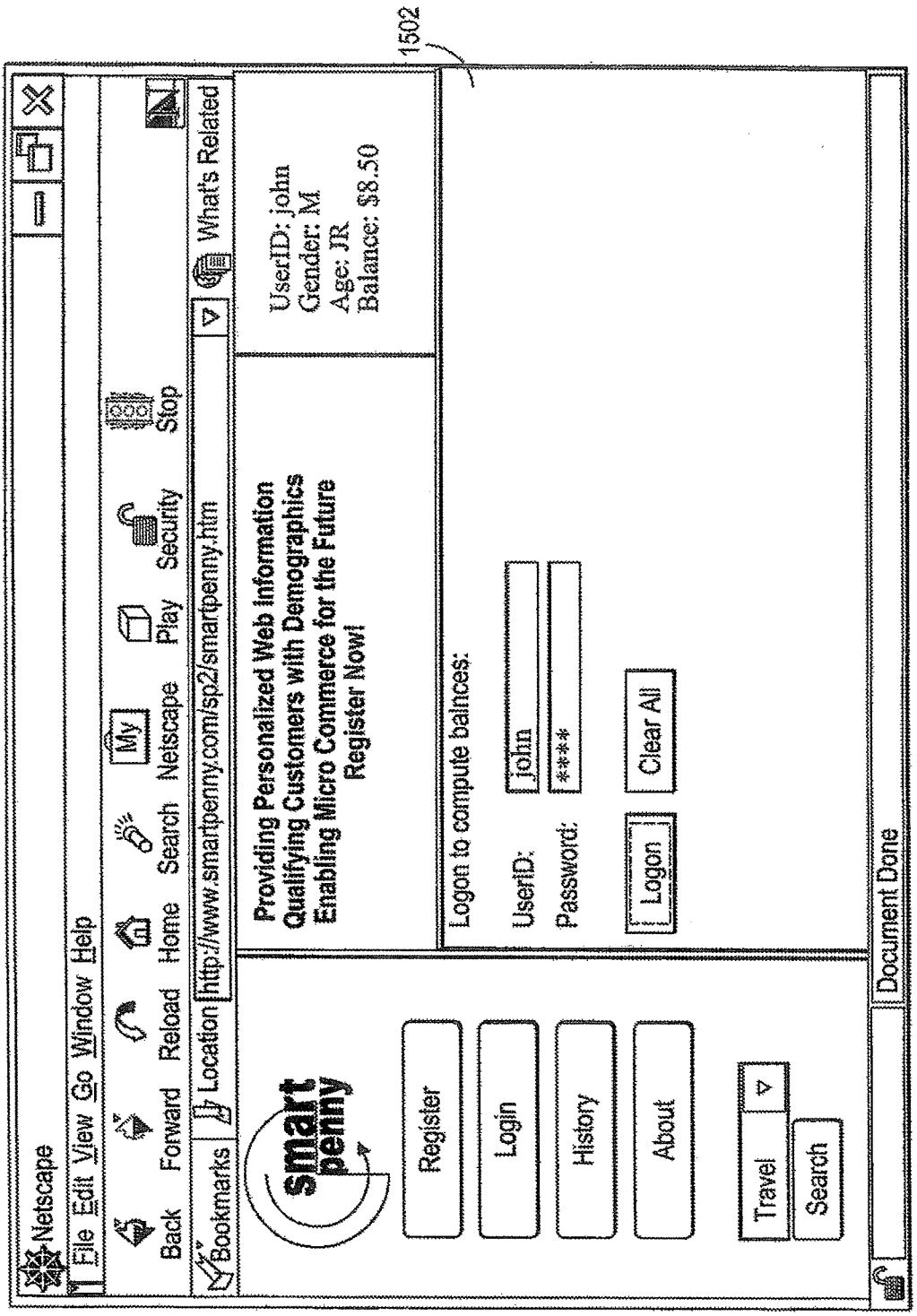
FIG. 15 illustrates an example of a user's account balance screen in accordance with an embodiment of the present invention.

Once registered (see, e.g., FIG. 14, which shows an example of a registration sign-in screen 1402) and logged in, the user's username and/or account balance and/or demographic profile will appear either in a constant position of the window or by selecting a button or other element to provide the information in a pop up window (sec, e.g., FIG. 15 which illustrates an example of a user's account balance screen).

The user enters (e.g., via a text box) or selects the desired information/category to search for.

Figure 16:
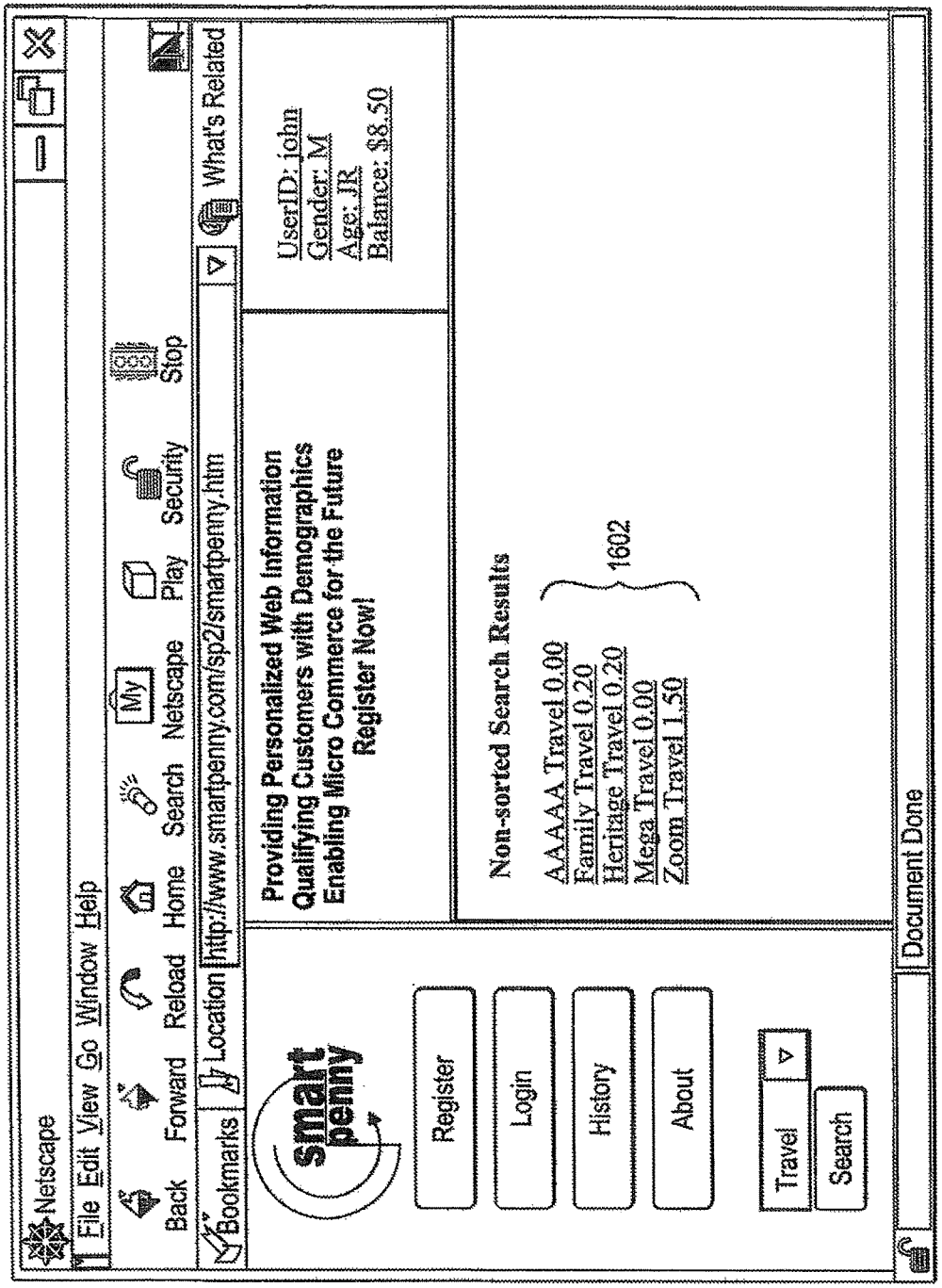
FIG. 16 illustrates an example of a search result returned using the user's demographic profile information in accordance with an embodiment of the present invention.

The user is returned a list of links relevant to the user's search criteria (see FIG. 16, which illustrates an example of a search result 1602 returned using the user's demographic profile information). Sites offering the highest reward value. will be listed first in the search results (rather than say a raking determined according to, for example, the number of times a certain keyword is used as a metatag, etc.), such rewards indicating the content provider's or advertiser's heightened interest in the user's demographic profile. This matchmaker function merges information about both parties, making a more efficient match for both, allowing destination sites to only pay large rewards to targeted (i.e., desired) users and allowing users to easily identify sites which desire them (as well as those which do not). For example, in FIG. 16, Zoom travel, which targets young males, appears at the top of the list rather than the bottom, which would be the tyranny of a mere alphabetical listing. AAAAA Travel, on the other hand, does not cater to young males and correspondingly appears with no reward; whereas a purely alphabetical listing would have placed it at the top of the list, presenting a poor search result for a for a young male user.

A site may also choose to represent its URL link as an expanded text link or a graphical banner, perhaps for a fee, when certain search-user demographic criteria are met.

Search results may present the destination site names, descriptions, URLs, offered rewards, amounts bid, quality scores, popularity, relevance scores, or other data to assist the user in making his/her selection.

The list of relevant sites can be sorted in various manners. The list of relevant sites may be sorted by search relevance, popularity, reward potential, merchants bid, and merchant's quality score. Sorting by popularity might include the number hits to that site. Sorting by reward potential may include reward potential to that specific user. For example, John Doe may get $0.10 for visiting a particular site because of his gender, while Jane Doe might only receive $Q.05 for visiting the same site. Sorting by merchant bid includes the amount bid for the position in the returned list by the merchant.

Search results may be displayed as simple links, text descriptions or graphics. Users may also be given various options for displaying the search results. Users may list only the top "n" items offering a reward. Users may list only items offering reward above a certain threshold. Users may list only items offering a reward. Users may list only reward items and top "n" non-rewarding items per search score or popularity. Users may list all matching entries, including items with no reward. The user can set a default sort order for future searches. An advertiser may sponsor the use of the search engine and give users a reward for each search done with the sponsorship ad posted, up to a maximum cumulative reward set by the advertiser for a given time window. Sponsors may also choose how often the same user will be rewarded for repeated interaction.

User Rewards

Users earn rewards for desired activities. For example, users may be rewarded for registering with the present service, providing referrals, contributing demographic attributes, performing searches, and/or clicking through on hyperlinks. Once earned, user rewards can be exercised in several different ways such as being exchanged for cash mailed by check, electronically credited to an account, online or physical gift certificates, frequent flyer miles, charitable contributions, contest entries, etc.

Trading Post

Once a user has accumulated earnings in his/her account, the earnings can be exchanged using one or more redemption options. For example, a user can allocate $30 of earnings into $10 of online gift certificates, $5 of contest entries and a $15 check. A user can also choose that earnings be automatically allocated. For example, for every $20 a user may direct $5 to that week's contest, and $15 to a cash check.

Sweepstakes

Some embodiments of the present invention may include a progressive jackpot sweepstakes. For every certain activity engaged in by users and proportional to the number of entries in the contest, an amount of cash is placed in a progressive jackpot, the amount to be visible to all users.

A winner will be selected from among the entries and announced at a particular day/time interval to encourage users to log on at that specified time interval. The winner will be notified when he/she logs on. If the winner does not log on or claim the prize within a predetermined time interval of the announcement, a backup winner will be announced, encouraging users to log on a second time, and so on. Any prize award may be deposited into the user's account balance and can be allocated at the trading post.

Reading Ads

Ads may be displayed within a user's personal reward window as shown in FIG. 9. As shown, when rendered as a conventional banner ad 902, no bonus/reward information is displayed. Under the present scheme, however, banner ads may be rendered with the associated bonus calculation displayed 904, with additional information in a pop-up window 906, or without any information regarding bonuses 908. Other ad formats can also be used, e.g., splash screen ads, etc. When a user selects an ad, his/her account is credited with the corresponding reward. Limits can be set on rewards per user, or per ad, to discourage abuse.

If desired, some embodiments of the present invention can include a pop-up window that appears when the user positions her/his cursor over a portion of the ad. Using Java™, JavaScript and/or other scripting languages, the correct bonus and maximum bonus available may be displayed as a result of such cursor action. These bonuses reflect the available reward for providing the demographic and profile information entered by a user.

Ads hosted on web sites including embodiments of the present invention. If a user is not vet signed up or logged on, he/she may be presented with a sign up or log-on page. The user searches through the sorted search engine results and views the resulting ads and links. Next to each ad or link may be displayed the associated basic reward, the actual bonus reward, and the total potential bonus reward (see, e.g., FIG. 9). The user might not be shown ads for which the reward is zero due to either an expired time window or repeat usage restriction. When a user selects a link or banner ad enabled according to the present invention the user is directed to the designated destination site. The user's account is credited with the available reward. The destination host's account is debited—the amount of the user reward and the amount of the transaction commission (if any).

Ads and links hosted remotely. Ads and links enabled by embodiments of the present invention can be posted on any web site. Enabled ads or links may either appear as conventional, non-enabled ads or as conventional links to non-users (i.e., individuals that are not registered users of a service configured in accordance with the present invention). Users (i.e., those that are registered) should always be presented with the enabled version of such ads or links. For example (and referring to FIG. 1), advertiser 106a could host its own ads rather than storing them on the host 104. As such, the advertiser 106a might provide both enabled and non-enabled versions of these ads. Users of the host 104 who have logged in will automatically be shown the enabled ad.

This mechanism can also be used on web sites such as those of content providers 108a-c to encourage deeper interaction by visitors. For example, a user can be rewarded to take a survey, provide feedback or register for a product sample.

Consuming Content

Figure 10:
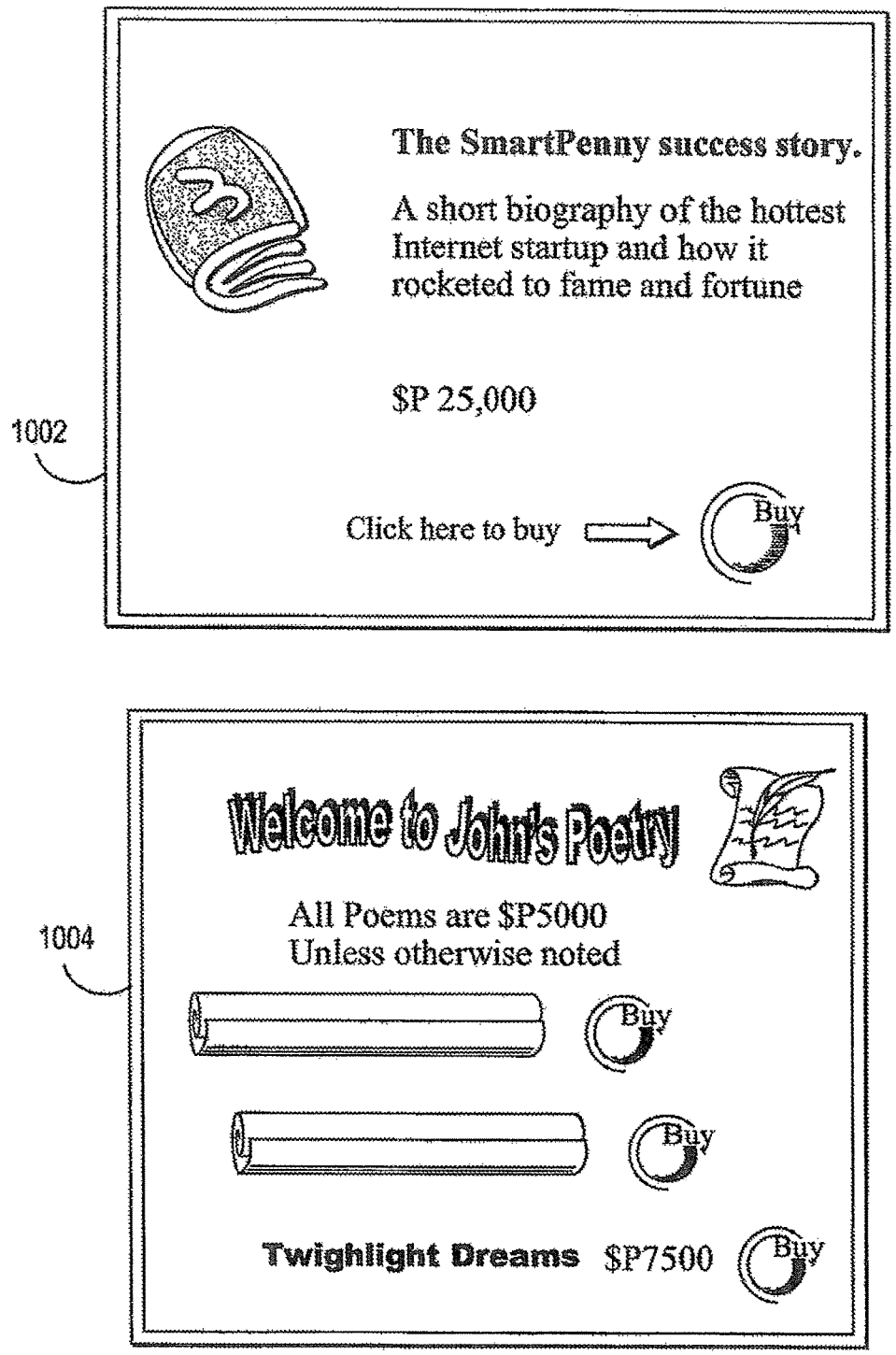
FIG. 10 illustrates examples of how the price of certain content may be listed next to links associated therewith in accordance with an embodiment of the present invention.
Figure 11A:
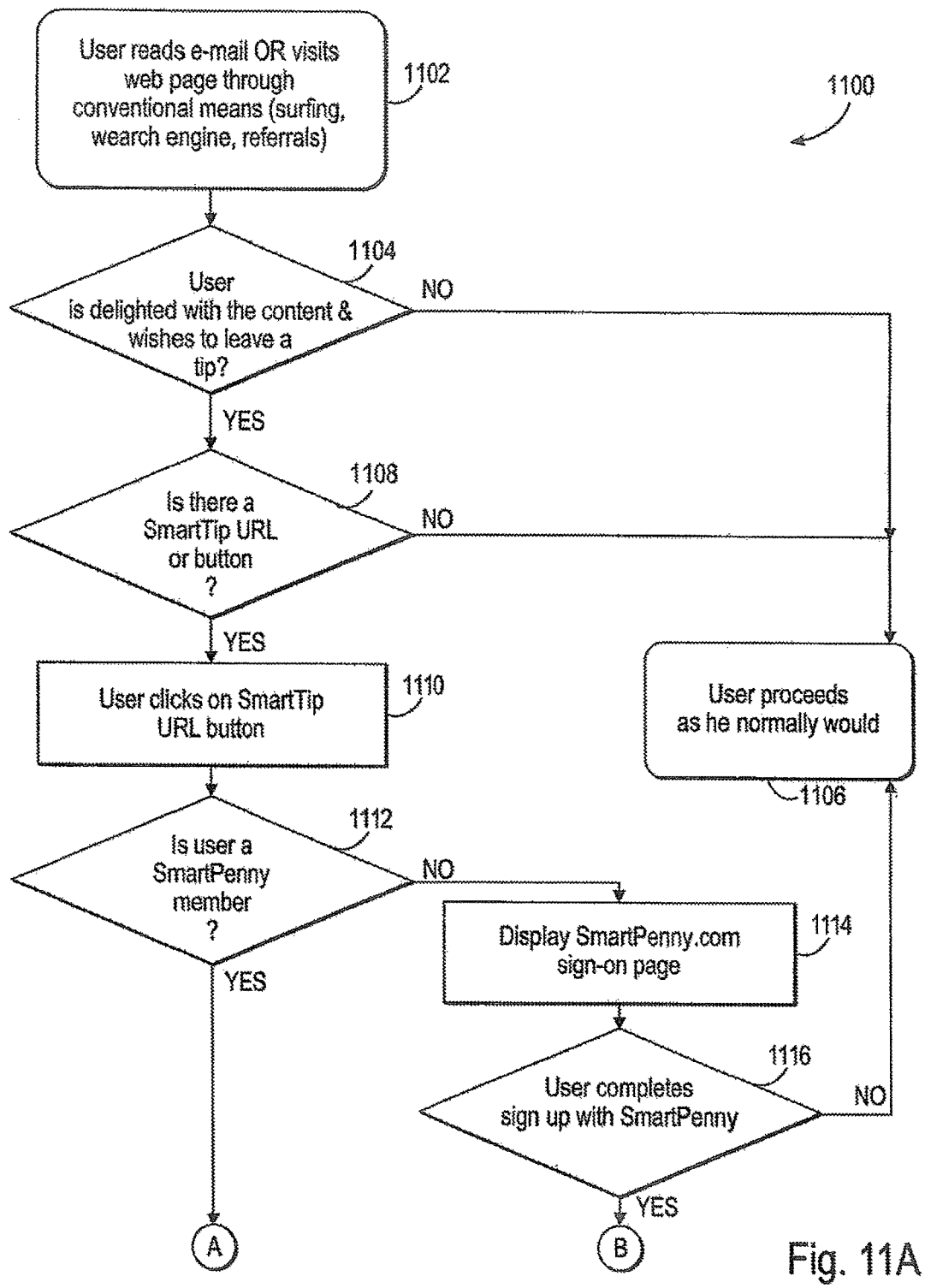
FIGS. 11A and 11B illustrate a process by which users may leave gratuities for content provides in accordance with an embodiment of the present invention.
Figure 11B:
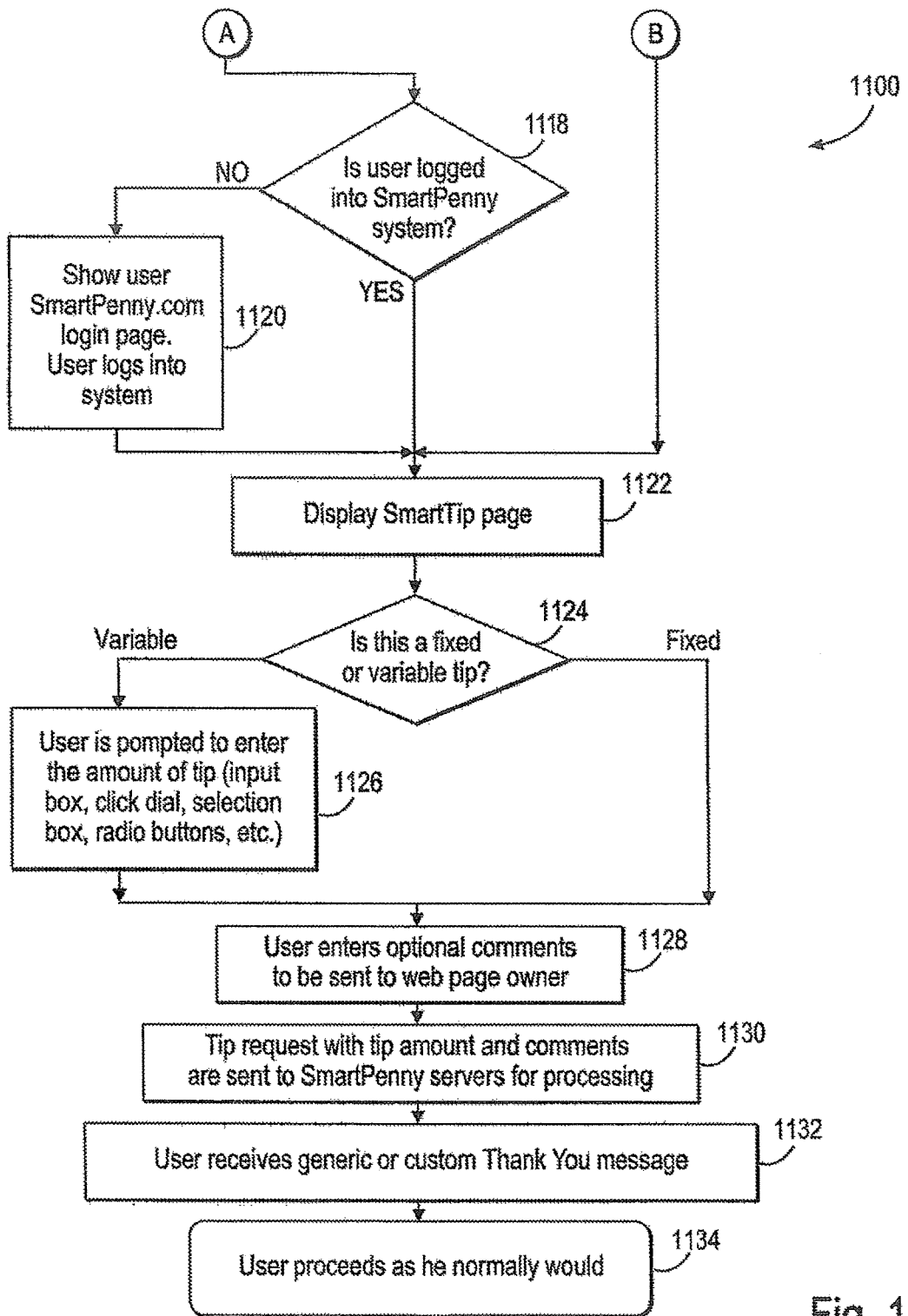

Enabled content may be displayed with an access price. Selecting a link associated with the content will cause the content to be delivered to the user or cause the user to be direct to a web site at which the content is available and credit/debit her/his account accordingly. The user may access such content from links returned by the search engine provided by some embodiments of the present invention or from the content provider's site, etc. The price of the content may be listed next to the link (see, e.g., FIG. 10). As shown, content prices may be displayed as part of a web page 1002 or in association with banner ads and the like 1004. Content providers may also bundle rewards for users to encourage their target customers to visit the content site. For example, different prices for the content may be set for in state vs. out-of-state residents, etc.

When a user clicks on a for-fee content link: Verification is performed to ensure that the user has sufficient credits in his/her account. If there is not a sufficient balance in the user's account, the user is advised of this fact and can be directed to an ad farm (e.g., a site at which a user can view multiple advertisements) to earn additional credit. If sufficient credit is available, the user is directed to the content site. The user's account is debited the content price. The content provider's account is credited the content price less a transaction commission if appropriate. In some embodiments, it is up to the content provider to define and set up the access control mechanism for their content. These content providers can define how often a user can access content that is paid for. For example, a cookie may be placed on the user's computer or web-access device recording that they have paid for access to the content site. Content providers can allow repeated access for a specified period of time and customize their site for paying return visitors.

Bonus and Research

Each ad, link or search result can calculate a bonus for a specific user based on that user's demographic profile and the ad's or link's desired target. In addition to simply qualifying users as members of a demographic group, advertisers can thus pay users in exchange for their specific profile information to do research.

In such a scheme, next to each ad, link or search result, the base reward may be listed along with the potential bonus and the actual bonus. The base reward is what is given to any unqualified visitor. The potential bonus reward is the total reward possible if a user meets all of an advertiser's demographic target criteria. The actual bonus is the reward that a user will receive based on their actual demographic profile. For example, out of a potential bonus of $1.00, a user may receive $0.50 because that user lives in San Jose (a desired demographic area for the advertiser), but not the additional $0.50 because the user is not male (the desired gender demographic of this advertiser).

By selecting a link associated with the potential bonus, the user can see the association between demographic information and rewards for a specific ad. If the user has not provided all of the desired demographic information, he/she may return to his profile and add the desired information in order to receive the additional bonus. For example, a particular user might not have originally submitted gender information with the user's profile, but over time the user might notice that ads give a higher reward for gender information. The user might thereafter add her/his gender information to her/his profile and from then on is entitled to receive the gender "bonus" when her/his gender fits the desired demographic profile for an ad/link, etc.

Demographic information can be held within a secure server and not transmitted across the network 102. Advertisers may, or may not be provided with a user's demographic profile immediately, and may only receive information indicating that the user satisfied the bonus criteria and qualified. When the user views a bonus ad, the user's demographic information is compared to the ad bonus Criteria and the bonus is calculated either at the host or at the user's client. When the user selects a bonus ad, the user is sent to the destination site. The user's account is credited with the base and bonus award. The advertiser's account is debited the same amount, plus a transaction commission if appropriate.

If an advertiser and/or researcher wants to collect actual demographic information on users (in addition to demographic qualification), and the user agrees, actual profile information requested, and approved by the user, can be stored in the advertiser's reports for later access. See also FIG. 6 for an example of a user profile matrix 600 that may be displayed to a user and which shows available reward points and configuration options associated with various user profile information.

Advertiser Registration

Advertisers can provide ads by creating an account with the host 104. An advertiser might typically provide a destination URL, a banner link, a demographic target, a reward structure (e.g., indicating the reward to be paid for specified demographic information, the portion of same to be passed on to the user, etc.), a working balance, and/or other information.

The following process is an example of how the advertiser may create such an account. Advertiser Selects Signup on Host. Advertisers can open an account by providing a banner image link, site description, a destination location, a desired reward rate and contact information. The ad can be activated when the advertiser deposits money (or an equivalent thereof, e.g., credit information) in their account to pay users. When an advertiser's account balance reaches zero, the ad can be withheld from display to users, or the ad may be displayed with no reward being offered to the users. Base rewards for non-qualified users can be set. A reward matrix 2102 listing one or more desired attributes can be completed (see, e.g., FIGS. 21A and 21B) for keywords, demographic attributes, if the user is a known customer of that merchant, and the amount of the bid to be passed through to the user as a reward.

Bonus rewards may be set up by the advertiser using bonus criteria, involving their desired reward for each piece of profile information (see, e.g., FIG. 5, which illustrates a user configuration matrix 500, e.g., a screen display that can be presented to the user, to be completed during the registration process and allows for attributes such as user name, age, gender, data of birth, zip code and/or household income to be specified and designated as being available for submission to advertisers, etc. automatically or not). Merchants and advertisers can choose the amount of reward to pass-through to the user.

Advertisers may set the reward for targeted users by completing an n-dimensional full factorial demographic reward matrix (see, e.g., FIG. 18, which shows an example of a reward matrix 1802).

Time caps may be set by the advertiser for the desired time which must elapse before a specific user can earn rewards from the same ad or link again. A number of allowed repeat visits by a user can be set.

An advertiser can set a cumulative reward cap per time-frame, e.g., $1,000 per 24 hours. An advertiser can set a cumulative reward cap per user, e.g., $20 per user per lifetime of ad. Rewards for repeat visitors can be set by an advertiser to stay the same, decrease or increase, e.g., $0.10 for a first visit, $0.05 for a second and subsequent visit, etc. Rewards can be varied over time. For example, an advertiser may offer a higher reward during lunchtime than in the late evening. Or, the advertiser may reduce the reward as his/her credit balance runs low to increase the length of time of the advertising campaign. Or, the advertiser may increase the available reward if an ad is not attracting enough attention from users.

Keywords for ads (e.g., to be used by the search engine) can be set by an advertiser. Each ad may be assigned an identifier for reference. Advertisers can monitor ad activity over the network 102. Reports may be generated with a timestamp for transactions, amount awarded, commissions, total debit, and resulting account balances.

Advertisers can use network-based tools for evaluating campaign activity with respect to demographics, activity over time, responses to reward changes and demographic targeting and data collection.

Credit can be added to an ad account at any time. When a campaign is completed, all unused account balances can be returned to the advertiser.

Content Provider Registration

Content providers can begin earning money on their site by creating an account online, e.g., by providing the site URL, price, and type of charge (e.g., up front or gratuity). The content provider may then insert a single line of HTML code to enable the earning process. This procedure may, in one example, be described as follows:

Initially, a content provider will register or sign up at host 104 with the service provider offering the present scheme. Content providers can create a content account at host 104 by providing their content price, content link and choosing a means of account transfer and contact information. Available content fee collection methods include collection of upfront fees or collection of gratuities. With upfront fees, the payments are fixed. That is, a user wishing to access the content must pay the set fee to be granted such access. A gratuity collection process allows users to pay voluntarily, without obstructing access to the content. Payment options for such tips can be customized as open, default suggested, check box selection, radio button selection, slide bar selection or fixed value options. This allows for great flexibility in incorporating the tip-payment feature into the content provider's web site.

Each content site URL can be assigned an identifier. Furthermore, the content provider can provide keywords (to be used by the search engine) for each content site. Once a content provider has registered, host 104 may transmit a URL to the content provider for use as a content fee or tip link and any appropriate HTML, JavaScript or other code to embed in the relevant web site to enable such operation.

Content providers can monitor their account activity over the network 102. Reports can be generated with a timestamp for each transaction, the amount charged, and any commissions paid out/generated, net credit, and resulting account balances. These account balances can be transferred to any ordinary account such as a bank account or credit card account, or cash can be paid out as a check. Alternatively, the balance can be credited to a user account. The operator of host 104 may charge service fees for these services.

Merchant (Advertiser and Content Provider) Quality Control

Merchants will preferably be validated on inspection before their account is activated. In addition, members of the user community may be invited to contribute their own evaluations of merchant quality on an ongoing basis. To ensure the quality of user reviews, such a process may be by invitation only. Alternatively, or in addition, users may periodically, at random or at an interval to be determined by a mathematical or statistical algorithm, be invited to review sites that they have actually visited through the system and offered a reward for completing the review. Users may thus be presented with a short list of web sites that they have recently visited through the search engine and asked to provide feedback in exchange for a reward. The reward may be any combination of credits, cash, sweepstakes entries or any other form of remuneration acceptable to the user. The results of these reviews by the user community may then be summarized into a numerical score, also known as the merchant quality score. The higher the Merchant quality score, the better the merchant's rating. This quality score may be displayed with search results to give users a better idea of the popularity or level of satisfaction for a particular merchant web site.

Tipping

Content providers can enable tipping to collect voluntary fees or donations from users. After providing the tip, the user can be sent to a thank you page. FIGS. 1A-11B illustrate aspects of the tipping process in detail. Web page-based tipping provides a means for voluntary payments, which can be used when a content provider wants to collect fees without erecting entry barriers for users. In such a scheme, a user views content including a tip icon, a tip form, tip link, or some other means to be directed to a payment site, etc. To then provide a tip, the user simply selects the icon, link, etc. and designates the appropriate gratuity at the site to which he/she is then directed. If a user is not yet signed up or logged on, he/she may be presented with a sign up or log-on page.

In accordance with the process shown in the diagrams, a process 1100 begins with the user receiving an invitation to visit a content site (step 1102), for example via e-mail or while web surfing. After visiting the site the user may decide whether he/she enjoyed the visit (step 1104). If not, the user continues surfing in the conventional fashion (step 1106). However, if the user did enjoy the visit to the web site and wants to express his/her appreciation to the content provider, the user can select a link to a gratuity site if one is provided (steps 1108 and 1110). At the gratuity site (or perhaps en route thereto), a determination may be made as to whether the user is a registered user of the present service (step 1112). If not, the user is offered the opportunity to register (step 1114) and the user may accept or decline the invitation (step 1116). If he/she declines, the user continues surfing in the conventional fashion.

In the case where a user is already a registered user a determination is made as to whether the user is presently logged on to the system (step 1118). If not, the user is asked to sign in (step 1120). Ultimately, the user is directed to the site at which he/she can leave a gratuity (step 1122). While at the site, different procedures may be followed depending on whether the site is a set gratuity or variable gratuity site (step 1124). For variable gratuity sites, the user is provided with the opportunity to indicate the amount of the tip to be provided (step 1126). In either case, the user enters the tip amount and may then provide comments (step 1128) to be provided to the content site provider. The tip authorization and the comments may be provided to the host 104 (step 1130). In return, a "Thank You" or similar message may be provided to the user (step 1132) and the user may continue surfing (step 1134).

At the payment site, a pop up window or other display feature (e.g., a separate web site) may present the user with one or more possible tip options (suggested amount, blank window, selectable amount options, slide bar amount, radio button selected amount, or default amount options, etc.). FIG. 12 illustrates some of these options, such as a radio button 1202 which may be selected to direct the user to a site where he/she might leave a gratuity and text boxes 1204 and 1206 where the user may enter a tip amount and any comments on the content or experience provided by the web site. The pop up window may also provide the user with a text box to submit comments on the content.

When a user indicates a tip should be paid, host 104 may verify that the user has sufficient balance in his/her account for the tip amount submitted. If there is not sufficient balance in the user's account; the user may be advised of his/her balance with a link to view ads (e.g., to earn more reward points) and thereafter return to the tip window to leave the tip.

Once tipping is complete, the user can be automatically directed to the content provider's "Thank You" page, another selected page, and/or a generic "Thank You" message can be displayed. At host 104, the user's account is debited the tip amount and the content provider's account is credited the tip amount less a transaction commission, if appropriate. A cookie may be placed on the user's web browser recording that they have paid for access to the content site. Content providers can thus customize their sites for paying return visitors. For example, return customers who have left tips in the past might get a special welcoming message and/or receive a special reward on a return visit.

An alternative process uses so-called "Email Tips". In this scheme, a tip URL can be transmitted in a text e-mail. Then, when the user selects on the URL, the tip functions the same as a web based tip.

Limiting Spam Through Quizzes

The quizzes described above can also be used in other environments. For example, a quiz can be embedded in a mail transport agent (MTA) or mail user agent (MUA) to verify that senders are human to assist in filtering undesired or "spam" e-mails. The following process can be used. If email is received from an unknown sender, e.g., by checking against a list of known senders, the MTA and/or the MUA may transmit a URL to site that includes a quiz, or include a quiz in a return e-mail to the unknown sender. This email might notify the sender that his/her original e-mail will not be opened or otherwise processed until the recipient thereof receives some confirmation that the sender is a live person and not some automated process. Hence, the e-mail might explain the purpose of the quiz and invite the sender of the original e-mail to "take the quiz".

If the quiz is not answered correctly within a predetermined period, e.g., 24 hours, the original e-mail may be deleted or returned as undeliverable. By verifying that the sender is human, automated (so-called "spam") e-mails can be filtered out. The user can also add the sender of any spam messages to a list of known "spammers" so that future quizzes can be avoided. Similarly, the user can add any mailing lists they participate in to a list that permits mails from that list to pass through to the user's in-box.

The quizzes can be provided at a host, e.g., the host 104, for free or for a small fee, e.g., $0.03 per quiz provided to unknown sender. Such fees can be automatically deleted from the user's accounts. Further, the spam control feature can be offered completely separate and apart from the micro payment system, e.g., $10.00 (or some other flat fee) for a year's worth of Spam filtering using quizzes. Alternatively, the quizzing system can be integrated with the MTA and/or MUA on the user's personal computer. For example, the "sendmail" process, a common MTA known in the art, could be programmed to check a sender against a user's known list. If the sender is absent from the known list, the sendmail process could queue the mail for delivery pending a response to an e-mailed picture containing a quiz generated by the MTA.

Technical Methods

Figure 19:
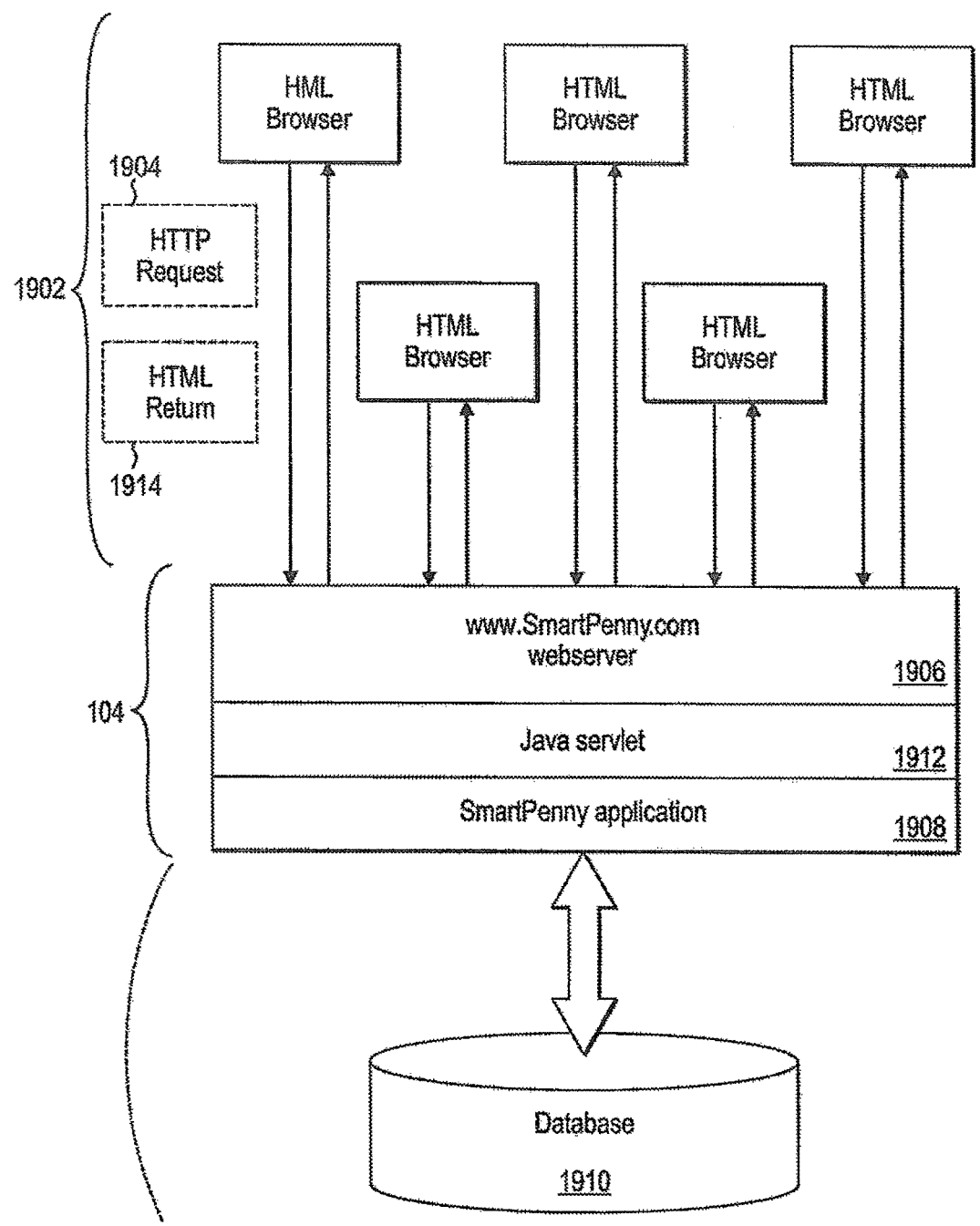
FIG. 19 illustrates an example of various software and/or hardware layers of one or more computer systems that may be utilized in providing the services of the present invention.

The present system (see FIG. 19) is designed to solve several technical problems and includes a standard user interface 1902 that may make use of a conventional web browser, facilities to allow for minimized transactions costs, the ability to serve many users concurrently and secure information transfer without high overhead costs. The interface to the user is conventional HTML and JavaScript, allowing users of the system to rely on conventional web browsers for access and operation.

All functions on the present system begin with the user entering information into a conventional HTML form and submitting a conventional HTTP request 1904 to the web host 104. The 1-1TrP request may contain a call to the web server application 1906, which facilitates communication between the HTML interface 1902, application business rules 1908 and any back-end database server 1910. Because the request is to an overlying application 1908 rather than to a database 1910 directly, system efficiency and scalability are enhanced. The application 1908 can securely hold the database connections open, greatly reducing the overhead on the server 1906 for each database query (alternative solutions require a database open/close for each query).

The application program 1908 (which may or may not be accessed through a middle layer Java Servlet 1912) discussed above may use programmed business rules to determine what queries need to be sent to which databases 1910 and may make database calls in a single block. This low-overhead process coupled with the ability to run multiple copies of the application program 1908 on the web server 1906 allow for many concurrent users. A multithreaded web server 1906 may balance requests to each copy of the application program 1908. The application program 1908 and database schema may be designed such that information about accounts, reward calculations, etc. are stored in the database 1910 and verified from the database 1910. Unauthorized users and automated web bots thus cannot simply make up a URL and send it in to increase their account balances. Once the application program 1908 processes a command, it builds and returns 1914 feedback to the users in FITML to the user's browser.

Although the foregoing description and accompanying figures discuss and illustrate specific embodiments, it should be appreciated that the present invention is to be measured only in terms of the claims that follow.

What is claimed is:

1. A method of differentiating between online activity performed by automated computer processes and online activity performed by a human, comprising:
    transmitting, by a first computer system, a prompt to a second different computer system including a presentation of one or more advertisements presented on the second different computer system and a corresponding question requesting an answer about content presented within the one or more advertisements on the second different computer system;
    receiving, at the first computer system, a response to the corresponding question that is submitted by way of text input through a text box presented at the second different computer system or by way of an audible response input through a microphone of the second different computer system;
    determining, by the first computer system, whether the received response includes a correct answer to the corresponding question about content presented within the one or more advertisements that are presented on the second different computer system; and
    when it is determined that the received response includes the correct answer to the corresponding question about content presented within the one or more advertisements that are presented on the second different computer system, classifying a respondent to the question as a human respondent rather than an automated computer process and granting, to the second computer system, access permission to a computer-based resource responsive to the received response otherwise, classifying the respondent to the question as the automated computer process rather than the human respondent and not granting access to the computer-based resource when the response lacks the correct answer.

2. The method of claim 1 wherein one of the one or more advertisements is a text, image, audio or video advertisement, and wherein granting access permission is conditioned on both of the received response including the correct answer and the correct answer being received within a specified amount of time of being presented the corresponding question.

3. The method of claim 2 wherein the corresponding question relates to content presented in at least one of the one or more advertisement and is embedded in the at least one of the one or more advertisements, and wherein the question is provided as an audio question.

4. The method of claim 1 wherein access to the computer-based resource is access to a different advertisement.

5. The method of claim 1 wherein access to the computer-based resource is access to a video based content item.

6. The method of claim 1 wherein one of the one or more advertisements is an olfactory or taste based advertisement and wherein the question relates to what the user can smell or taste.

7. The method of claim 1 further comprising determining an amount of time or amount of resources that will be accessible under the permission before a next prompt is transmitted including adjusting an interval for the next prompt including increasing an amount of time or resources associated with the interval from a baseline amount to an increased amount when the respective response is inferred to have been provided by the human respondent.

8. The method of claim 7 wherein the increased amount is based on correctness or incorrectness of the human respondent's responses to prior prompts.

9. The method of claim 7 further comprising providing the second prompt after expiration of the interval.

10. The method of claim 1 wherein the computer-based resource comprises a resource adapted for sending an e-mail message.

11. The method of claim 1 wherein the computer-based resource comprises a Web site.

12. A method of differentiating between online activity performed by automated computer processes and online activity performed by a human, comprising:
    transmitting a prompt to a device including a presentation of one or more advertisements presented on the device and a corresponding question requesting an answer about content presented within the one or more advertisements on the device;
    receiving a response to the corresponding question that is submitted by way of text input through a text box presented at the device or by way of an audible response input through a microphone of the device;
    determining, by one or more processors, whether the received response includes a correct answer to the corresponding question about content presented within the one or more advertisements that are presented on the device; and
    when it is determined that the received response includes the correct answer to the corresponding question about content presented within the one or more advertisements that are presented on the device, classifying a respondent to the question as a human respondent rather than an automated computer process and granting access permission to a computer-based resource; otherwise, classifying the respondent to the question as the automated computer process rather than the human respondent and not granting access permission to the computer-based resource when the response lacks the correct answer.

13. The method of claim 12 further comprising:
    determining a time to provide a second prompt wherein determining a time includes determining a time based on a correctness of the response and correctness or incorrectness of one or more prior responses to other prompts; and
    sending the second prompt at the second time.

14. The method of claim 12 further comprising:
    determining an amount of time or amount of resources that will be accessible before a second prompt is transmitted including adjusting an interval for a next prompt including increasing an amount of time or resources associated with the interval from a baseline amount to an increased amount when the respective response is inferred to have been provided by a human respondent.

15. The method of claim 14 wherein the interval is based at least in part on correctness or incorrectness of the human respondent's responses to prior questions.

16. A system for differentiating between online activity performed by automated computer processes and online activity performed by a human, comprising:

a prompt generator for generating and transmitting a prompt to a computer system including one or more advertisements presented on the computer system and a corresponding question requesting an answer about content presented within the one or more advertisements on the computer system, and a means for a human operator of a computer system to provide a respective answer thereto; and a response evaluating engine that receives a response to the corresponding question that is submitted by way of text input through a text box presented at the computer system or by way of an audible response input through a microphone of the computer system, determines, whether the received response includes a correct answer to the corresponding question about content presented within the one or more advertisements that are presented on the computer system; and when it is determined that the received response includes the correct answer to the corresponding question, classifies a respondent to the question as a human respondent rather than an automated computer process and grants, to the computer system, access permission to a computer-based resource otherwise, classifies the respondent to the question as the automated computer process rather than the human respondent and does not grant access to the computer-based resource when the response lacks the correct answer.

17. A non-transitory computer program product including instructions that when executed cause one or more processors to:

transmit a prompt to a second different computer system including a presentation of one or more advertisements presented on the second different computer system and a corresponding question requesting an answer about content presented within the one or more advertisements on the second different computer system, and a means for a human operator of a computer system to provide a respective answer thereto;

receive a response to the corresponding question that is submitted by way of text input through a text box presented at the second different computer system or by way of an audible response input through a microphone of the second different computer system;

determine whether the received response includes a correct answer to the corresponding question about content presented within the one or more advertisements that are presented on the second different computer system; and when it is determined that the received response includes the correct answer to the corresponding question about content presented within the one or more advertisements that are presented on the second different computer system, classify a respondent to the question as a human respondent rather than an automated computer process and grant, to the second computer system, the human operator access permission to a computer-based resource responsive to the received response otherwise, classifying the respondent to the question as the automated computer process rather than the human respondent and not granting the human operator access to the computer-based resource when the response lacks the correct answer.

* * * * *

UNITED STATES PATENT AND TRADEMARK OFFICE
CERTIFICATE OF CORRECTION

PATENT NO. : 10,055,761 B2  
APPLICATION NO. : 14/263854  
DATED : August 21, 2018  
INVENTOR(S) : Lim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 980 days.

Signed and Sealed this  
Twenty-seventh Day of August, 2019

Andrei Iancu  
*Director of the United States Patent and Trademark Office*